(12) United States Patent
Vermeulen et al.

(10) Patent No.: US 10,380,144 B2
(45) Date of Patent: Aug. 13, 2019

(54) BUSINESS INTELLIGENCE (BI) QUERY AND ANSWERING USING FULL TEXT SEARCH AND KEYWORD SEMANTICS

(71) Applicant: Business Objects Software, Ltd., Dublin (IE)

(72) Inventors: Florent Vermeulen, Levallois-Perret (FR); Bruno Dumant, Verneuil sur Seine (FR); Mathieu Bournat, Nanterre (FR); Rodolphe Boixel, Courbevoie (FR); Alexis Naibo, Levallois-Perret (FR)

(73) Assignee: Business Objects Software, Ltd., Dublin (IE)

( * ) Notice: Subject to any disclaimer, the term of this patent is extended or adjusted under 35 U.S.C. 154(b) by 748 days.

(21) Appl. No.: 14/856,984

(22) Filed: Sep. 17, 2015

(65) Prior Publication Data

US 2016/0373456 A1 Dec. 22, 2016

Related U.S. Application Data

(60) Provisional application No. 62/180,288, filed on Jun. 16, 2015, provisional application No. 62/180,285, filed on Jun. 16, 2015.

(51) Int. Cl.
*G06F 16/28* (2019.01)
*H04L 29/06* (2006.01)
(Continued)

(52) U.S. Cl.
CPC .......... *G06F 16/283* (2019.01); *G06F 16/245* (2019.01); *G06F 16/248* (2019.01);
(Continued)

(58) Field of Classification Search
None
See application file for complete search history.

(56) References Cited

U.S. PATENT DOCUMENTS

| 5,485,564 A | 1/1996 | Miura et al. |
| 6,587,102 B2 | 7/2003 | Taylor et al. |
| (Continued) | | |

OTHER PUBLICATIONS

Notice of Allowance for U.S. Appl. No. 14/856,972, dated Apr. 19, 2018, 21 pages.

(Continued)

*Primary Examiner* — James Trujillo
*Assistant Examiner* — John J Morris
(74) *Attorney, Agent, or Firm* — Mint Levin Cohn Ferris Glovsky and Popeo, P.C.

(57) ABSTRACT

A computer-implemented method for initiating, at a user interface, execution of a software application implementing a plurality of business processes associated with a plurality of business objects, and displaying, in the user interface, a query box and a plurality of visualizations depicting data corresponding to at least a portion of the plurality of business objects. The method includes receiving and parsing a free text input, generating and executing a search using a plurality of keyword search queries based on one or more keyword tokens. The method also includes applying grammar rules, generating query trees, and generating a number of search suggestions using the query trees.

20 Claims, 21 Drawing Sheets

(51) Int. Cl.
*G06F 16/248* (2019.01)
*G06F 16/332* (2019.01)
*G06F 16/2458* (2019.01)
*G06F 16/33* (2019.01)
*G06F 16/2457* (2019.01)
*G06F 16/901* (2019.01)
*G06F 16/245* (2019.01)
*G06F 16/25* (2019.01)
*G06F 16/31* (2019.01)
*G06F 17/27* (2006.01)

(52) U.S. Cl.
CPC .... *G06F 16/2465* (2019.01); *G06F 16/24575* (2019.01); *G06F 16/25* (2019.01); *G06F 16/322* (2019.01); *G06F 16/334* (2019.01); *G06F 16/3322* (2019.01); *G06F 16/3329* (2019.01); *G06F 16/9024* (2019.01); *G06F 17/277* (2013.01); *H04L 63/08* (2013.01); *H04L 63/102* (2013.01)

(56) References Cited

U.S. PATENT DOCUMENTS

| | | | |
|---|---|---|---|
| 6,859,937 | B1 | 2/2005 | Narayan et al. |
| 7,917,462 | B1 | 3/2011 | Shatdal |
| 8,051,073 | B2 | 11/2011 | Tunkelang et al. |
| 8,898,140 | B2 | 11/2014 | Cooper et al. |
| 8,935,249 | B2 | 1/2015 | Traub et al. |
| 2002/0016924 | A1 | 2/2002 | Shah et al. |
| 2005/0041027 | A1 | 2/2005 | Chickering et al. |
| 2006/0282411 | A1 | 12/2006 | Fagin et al. |
| 2008/0027788 | A1 | 1/2008 | Lawrence et al. |
| 2008/0294596 | A1 | 11/2008 | Xiong |
| 2009/0012842 | A1 | 1/2009 | Srinivasan et al. |
| 2009/0033664 | A1 | 2/2009 | Hao et al. |
| 2009/0043749 | A1 | 2/2009 | Garg et al. |
| 2011/0137919 | A1 | 6/2011 | Ryu et al. |
| 2012/0158633 | A1 | 6/2012 | Eder |
| 2014/0188935 | A1* | 7/2014 | Vee ............... G06F 17/3043 707/771 |
| 2014/0250053 | A1 | 9/2014 | Averbuch |
| 2016/0063081 | A1 | 3/2016 | Rudolf et al. |
| 2016/0063093 | A1* | 3/2016 | Boucher ......... G06F 17/3064 707/748 |
| 2016/0103902 | A1 | 4/2016 | Moser et al. |
| 2016/0373423 | A1 | 12/2016 | Naibo |

OTHER PUBLICATIONS

Bao, Junwei , et al., "Constraint-Based Question Answering with Knowledge Graph", Bao et al.; "Constraint-Based Question Answering with Knowledge Graph"; Proceedings of COLING 2016, the 26th International Conference on Computational Linguistics: Technical Papers; Osaka, Japan; Dec. 11-17 2016; pp. 2503-2514.

Chieu, Trieu C., et al., "Enterprise Telesales Opportunity Pipelines Performance Management", Chieu et al.; "Enterprise Telesales Opportunity Pipelines Performance Management"; IEEE International Conference on e-Business Engineering; Oct. 2006; pp. 433-441.

* cited by examiner

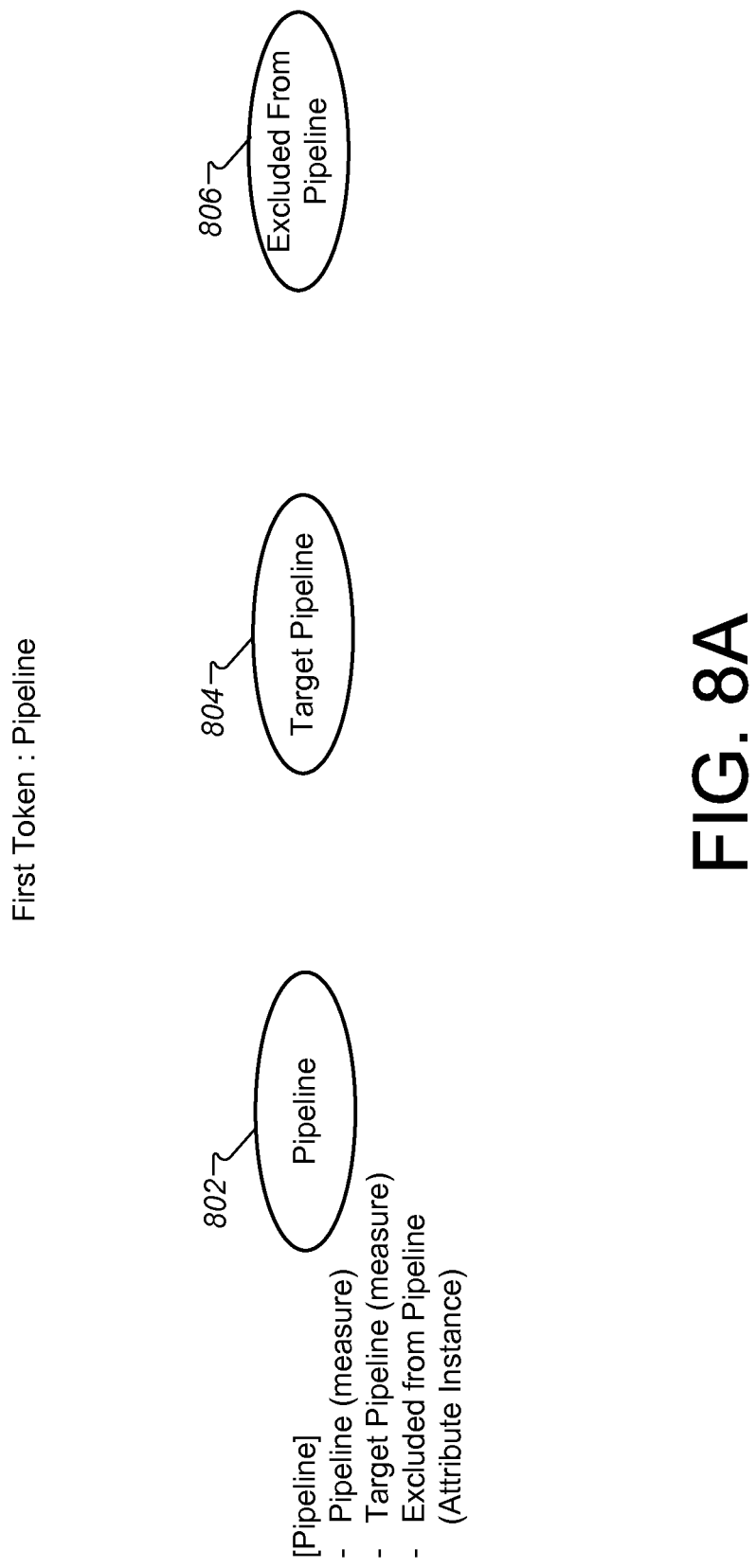

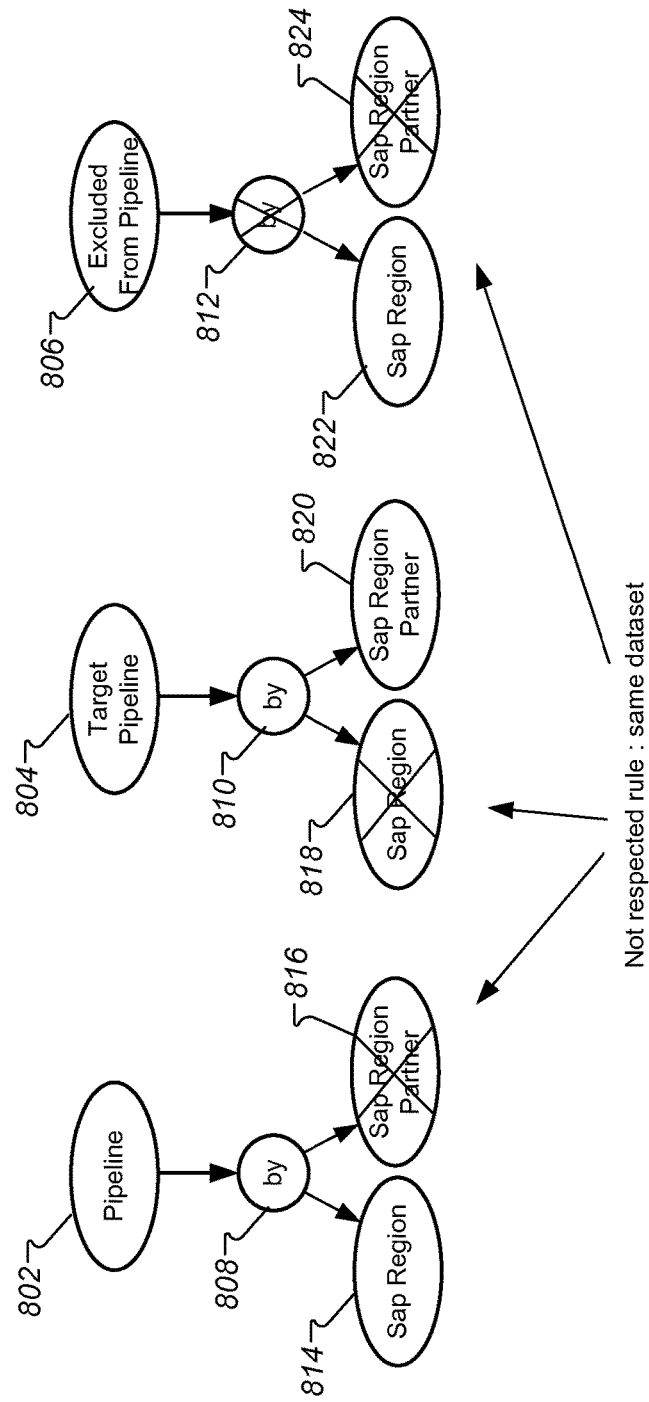

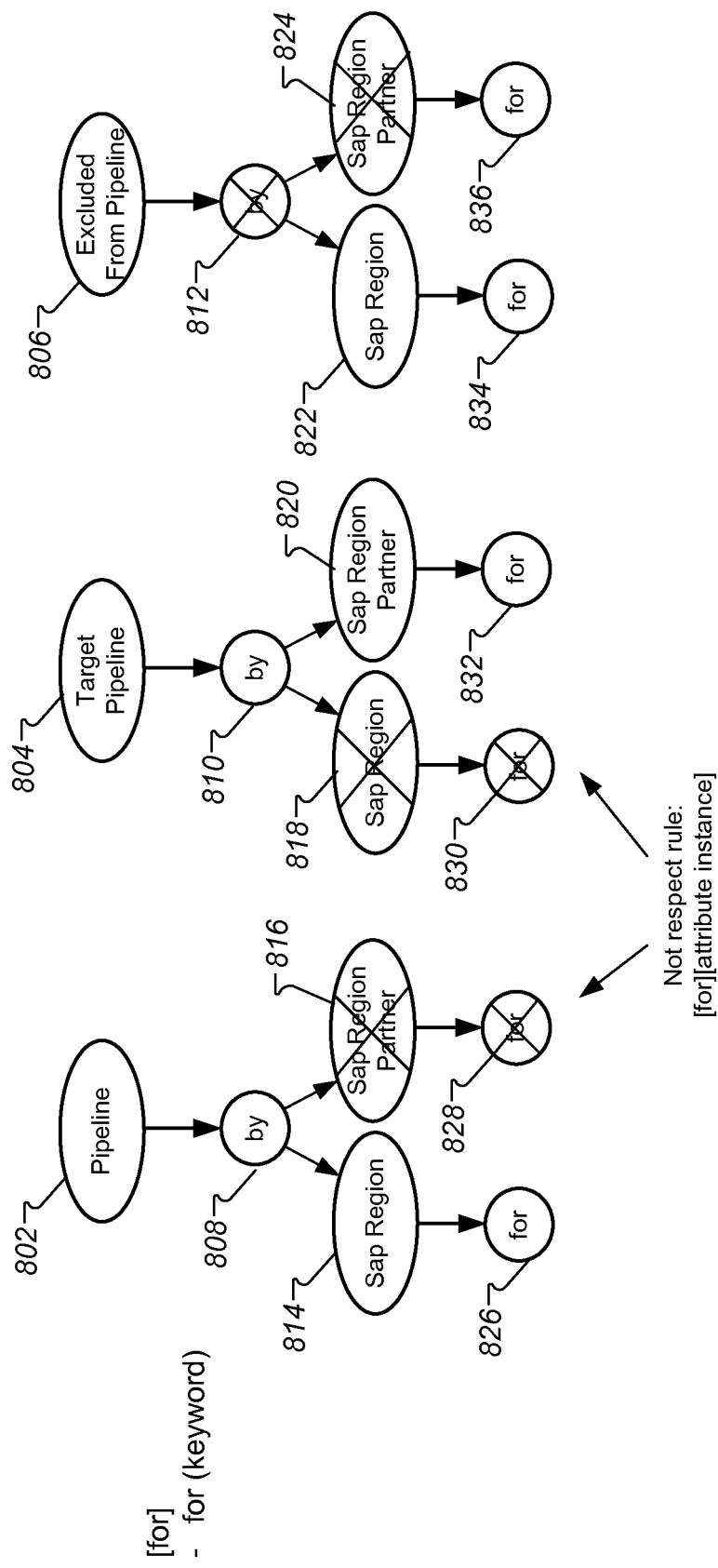

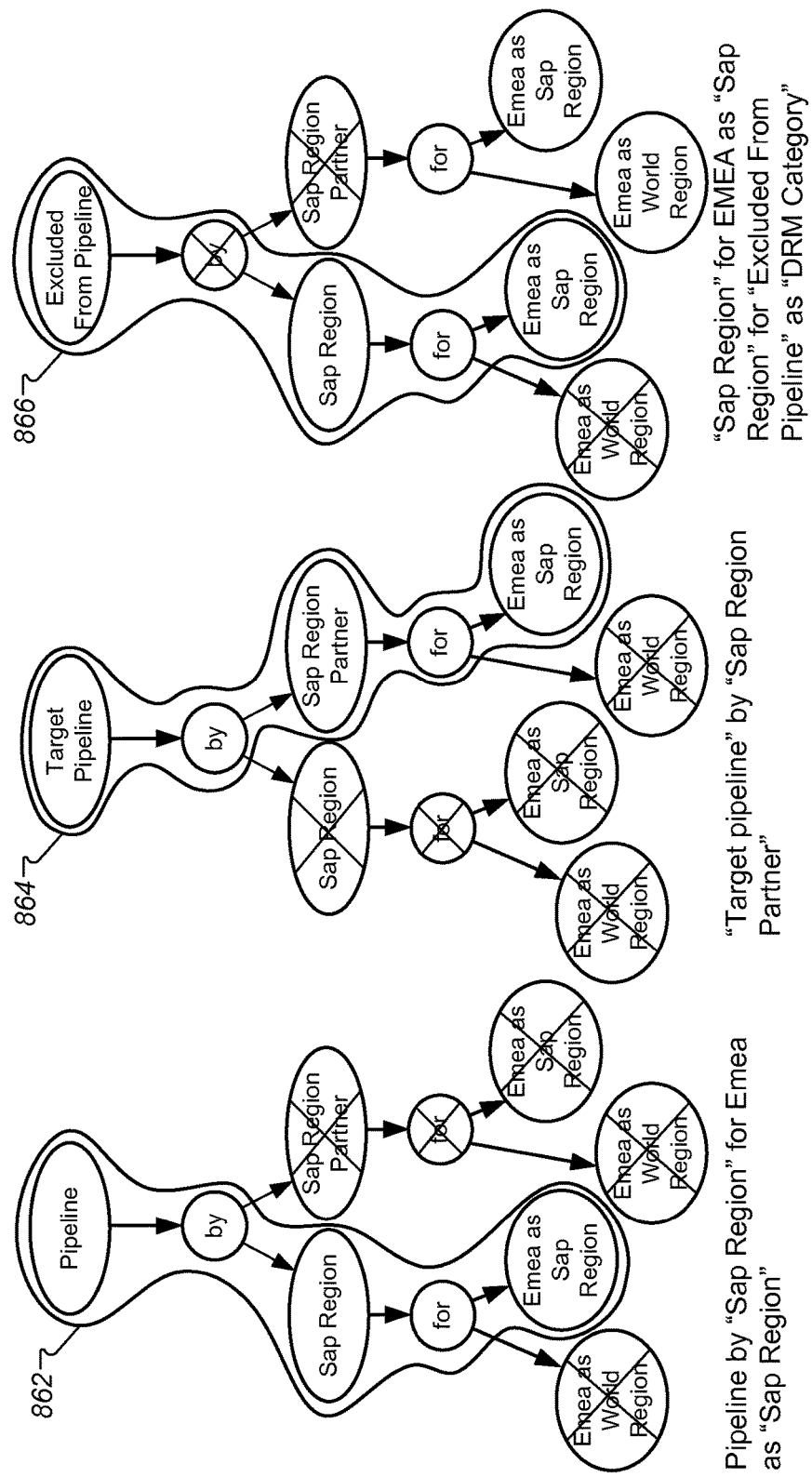

List of Pipeline by Sales Phase for Analytics, Q3, 2014

| Sales Phase | Pipeline |
|---|---|
| A-Purchase | ▭ 68.2 M |
| A-Secure Agreement (FS) | |
| B-Negotiate | ▭ 95 M |
| C-Complete Proposal (FS) | |
| C-Select | ▭ 452 M |
| D-Evaluate | ▭ 646.9M |

# BUSINESS INTELLIGENCE (BI) QUERY AND ANSWERING USING FULL TEXT SEARCH AND KEYWORD SEMANTICS

CROSS REFERENCE TO RELATED APPLICATIONS

This application claims the benefit of U.S. Provisional Application No. 62/180,288, filed Jun. 16, 2015, and U.S. Provisional Application No. 62/180,285, filed Jun. 16, 2015, the entire contents of which are incorporated by reference in their entirety.

TECHNICAL FIELD

This description relates to business intelligence (BI) query and answering using full text search and keyword semantics.

BACKGROUND

A typical organization, such as a business enterprise collects large amounts of data. In such a situation, sophisticated data solutions are in demand in order to quickly and accurately access data desired by users from massive amounts of data managed by the business enterprise.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes initiating, at a user interface, execution of a software application implementing a plurality of business processes associated with a plurality of business objects, and displaying, in the user interface, a query box and a plurality of visualizations depicting data corresponding to at least a portion of the plurality of business objects. The method also includes receiving and parsing a free text input in the query box into tokens, generating a plurality of keyword search queries based on the one or more keyword tokens, and executing the plurality of keyword searches against a metadata repository. The method also includes obtaining a plurality of search results responsive to the one or more keyword searches, the search results including business data, and for each search result and retrieving a set of predefined grammar rules associated with the business data in order to apply the set of grammar rules to determine whether combining content associated with one or more of the plurality of keyword tokens and the business data associated with one or more of the plurality of search results complies with the grammar rules. The method additionally includes generating a query tree that connects a first node representing the one or more keyword tokens to a second node representing the business data associated with one or more of the plurality of search results, in response to determining compliance to grammar rules and generating a plurality of search query suggestions using the query tree to retrieve data corresponding to one or more grammar compliant data paths defined in the query tree by one or more connected node. Other embodiments of this aspect include corresponding computer systems, apparatus, and computer programs recorded on one or more computer storage devices, each configured to perform the actions of the methods.

Implementations of the described techniques may include hardware, a method or process, or computer software on a computer-accessible medium. Implementations may include one or more of the following features. Implementations of the described techniques may include hardware, a method or process, or computer software on a computer-accessible medium. One or more implementations may include the following features. For example, one implementation may include generating, in the query tree, a node that prohibits connection between the first node and the second node, in response to determining violation of one or more grammar rules. Another feature may include iteratively adding one or more nodes to each generated query tree until exhausting the keyword tokens, assigning a score to each generated query tree, generating the plurality of search query suggestions and providing the search query suggestions for display in the user interface in a ranked order, according to the score associated with each generated query tree, and providing, in the user interface, a fixed number of search query suggestions based at least in part on the score and on a predefined time constraint.

One or more implementations may include a feature of the metadata repository being configured to store metadata about the plurality of business objects and relationships between one or more of the plurality of business objects. In some implementations, the grammar rules are retrieved from a knowledge graph configured to include contextual knowledge data between business objects, relationship knowledge data between business objects, and behavioral knowledge data between business objects and the grammar rules are configured to invoke a soft keyword grammar configured to generate a set of ranked search queries.

Another feature of the method may include having at least one of the plurality of search query suggestions is translated into graphical data and presented to the user in the user interface, in response to the user selecting the at least one search query suggestion, the translation including accessing one or more repositories of data to generate sales data associated with at least one business object in the plurality of business objects. Another feature of the method may include limiting each generated query tree to fifty nodes, and adding each generated tree to a knowledge graph to provide business search functionality to other users accessing the software application.

Another general aspect includes a query management system including instructions stored on a non-transitory computer-readable storage medium. The system includes a query engine configured to generate a plurality of keyword search queries using one or more keyword tokens, execute the plurality of keyword searches against a metadata repository, obtain a plurality of search results responsive to the one or more keyword searches, generate a plurality of query trees, and from the plurality of query trees, generate a plurality of search query suggestions to retrieve data corresponding to one or more rule compliant data paths defined by the plurality of query trees, and provide query suggestions for display in a user interface. The system also includes a knowledge graph including a plurality of query trees configured to connect a plurality of nodes representing data objects associated with keyword tokens and business data in response to determining compliance to grammar rules and a security engine configured to implement security rules to allow or deny presentation of query suggestions to a user of the user interface, the security rules being based on user usage data, knowledge graph rules, and grammar rules.

Implementations may include one or more of the following features. Implementations of the described techniques may include hardware, a method or process, or computer software on a computer-accessible medium. For example, the security engine is configured to deny access to one or more query suggestions by removing the one or more query suggestions from a list of generated query suggestions before providing the list to a user, the denied access based at least in part on determining that user credentials, associated with the user accessing the user interface, are insufficient. In some implementations, the knowledge graph includes a plurality of nodes and edges, the nodes representing business objects having a plurality of functions and variables, and the edges represent similarities between one or more function or variable associated with at least two business objects connected by at least one edge. Other embodiments of this aspect include corresponding computer systems, apparatus, and computer programs recorded on one or more computer storage devices, each configured to perform the actions of the methods.

According to another general aspect, a computer program product may be tangibly embodied on a computer-readable medium and may include executable code that, when executed, is configured to cause at least one data processing apparatus to perform the following operations.

The details of one or more implementations are set forth in the accompanying drawings and the description below. Other features will be apparent from the description and drawings, and from the claims.

BRIEF DESCRIPTION OF THE DRAWINGS

FIGS. 8A-8F illustrate an example of building query suggestions.

FIG. 13 is a screenshot illustrating yet another example user interface with search results responsive to text entered into a query box.

DETAILED DESCRIPTION

Figure 1:
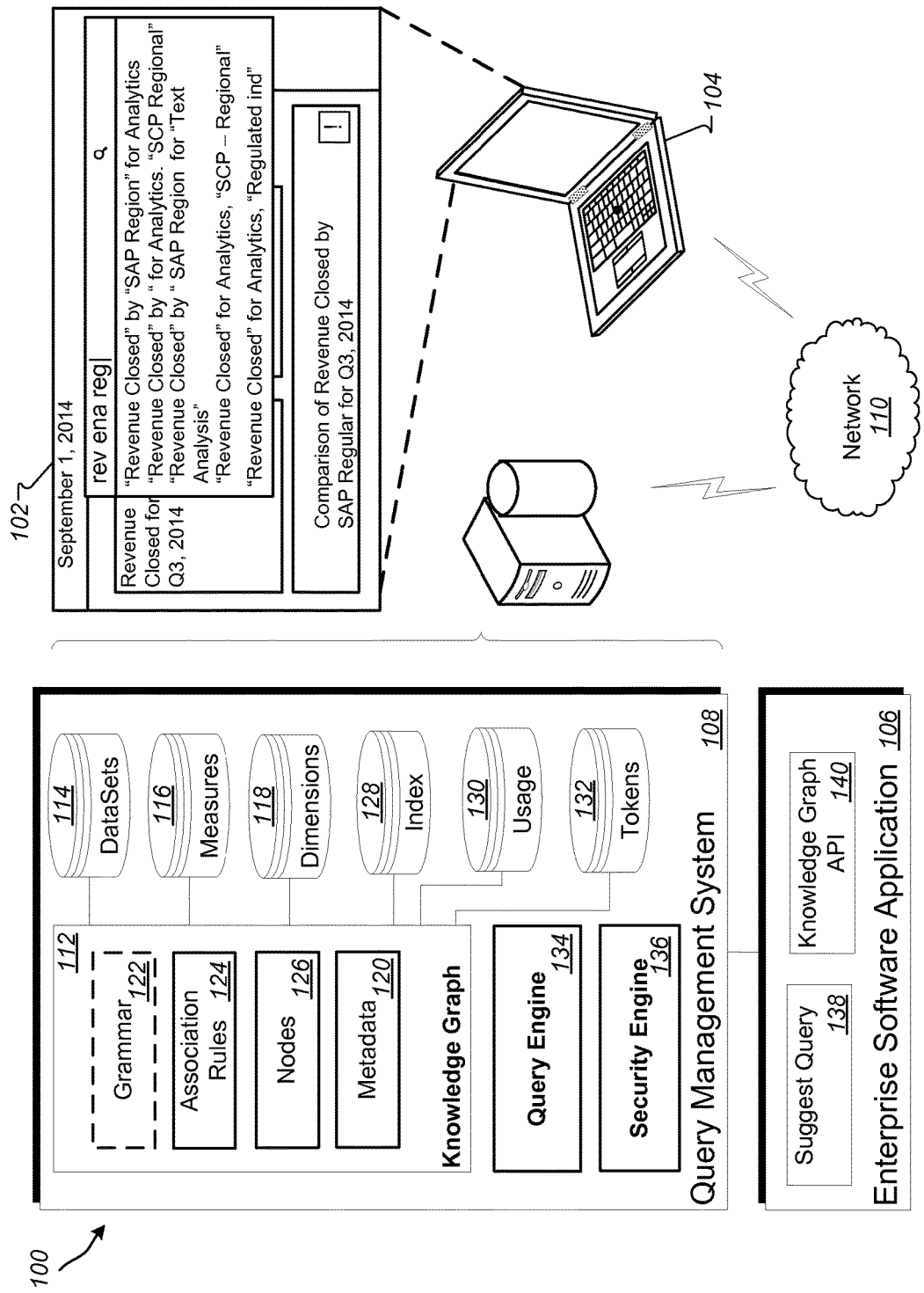
FIG. 1 is a block diagram of a system for generating and providing query suggestions in a user interface associated with business software executing at a client device.

Accessing one or more applications to obtain relevant data (e.g., business object data) from a vast amount of stored data can be a complex task for a user. Obtaining such business object data may include performing searches against data associated with the one or more applications. The systems and methods described in this disclosure can provide a query and answer system that builds a set of consistent queries based on user-entered data. The set of queries can be configured to access business data that is deemed relevant or meaningful to a business data user. The keywords can be used to build the set of queries using rich business intelligence semantic information, syntactic keyword rules, combination rules, and security rules. In general, the set of queries may be posed using textual, numerical, symbolic, or combinatorial keywords that can be system-configured based on user input.

Users of an enterprise software application may wish to access data efficiently without having to spend valuable time learning complex search syntax, tools, or query languages to search repositories of data. These users may wish to have the expressiveness of an advanced tool, without committing the time to learn such a tool. The systems and methods described in this disclosure can provide the advantage of an expressive tool without the time commitment. Namely, the systems and methods are configured to perform multiple full text searches by using a grammar of keywords and rules to generate a set of consistent queries that can be provided to the user for selection and presentation of subsequent search results. The set of consistent queries may refer to queries that use system data to recast the user-entered data into contextually relevant search queries. The recasting of user-entered data can enable a user to discover and learn keywords and semantic meanings of the keywords interactively in an enterprise software application, without having to access help files or programming manuals or languages.

In some implementations, the systems and methods described in this disclosure can perform compatibility determinations and provide relevant search result data without burdening the user with the analysis of comparing data, data fields, data attributes, data categories, etc. In short, the systems and methods described in this disclosure can provide relevant query strings to obtain relevant search results (i.e., contextually relevant data) based on user credentials, user input, user location within data, system rules, and associations between data stored in a knowledge graph.

The knowledge graph may include (or have access to) a plurality of repositories stored across any number of servers and networks. In some implementations, the knowledge graph may include multiple knowledge graphs constructed based on context and business object compatibilities. For example, multiple knowledge graphs may be constructed and indexed based on metadata that lists whether particular data (e.g., business objects, datasets, measures, dimensions, etc.) are compatible and/or combinable with other of such types of data. This can provide the advantage of filtering off particular data that may not be compatible with specific business objects, datasets, measures, dimensions, or users, etc. Filtering data in such a way can provide the user with relevant data geared to a specific need or context associated with the data being accessed and/or requested by the user.

Referring to FIG. 1, a block diagram of a system 100 is shown. The system 100 may be configured to provide a user interface 102 associated with business software executing at a client device 104. The client device 104 can display the user interface 102, which may be provided by an enterprise software application 106 and/or query management system 108, each executing as one or more server devices and connectable through network 110.

The example user interface 102 shown here includes a business application accessing or running enterprise software application 106 and/or requesting data via query management system 108. The user can access user interface 102 to obtain business data regarding business objects in the enterprise software applications 106. Textual and graphical content displayed in user interface 102 may include business data associated with a number of datasets, measures, and dimensions, each of which can be associated with a knowledge graph 112.

Datasets can represent a group of data combined based on a particular query context or based on a business object. The query context may refer to the context of data currently displayed to a user in interface 102. The list of selectable dataset names may be associated with datasets that are compatible with the particular query context. When datasets are presented, an initial dataset is automatically selected by the system 100 and this dataset is typically used to provide the initial query context with respect to measures and dimensions that pertain to the initial dataset. In some implementations, the initial dataset is used to set the query context until a user selects more content from user interface 102. Datasets may be stored and accessed from datasets repository 114.

Measures can represent data objects that include metrics such as sales revenue, salary, inventory stock, or number of employees, etc. In some implementations, the measures include a plurality of data objects that quantitatively define at least one attribute within a number of datasets. Measures provided for selection in the user interface 102 for selection are generally within the query context configured based on which datasets are selected. In some implementations, a user can select several measures to be included in data presented in interface 102. However, selecting one or more measures can affect other data presented in interface 102. Measures may be stored and accessed from measures repository 116.

Dimensions can represent data objects that include categorical data in a dataset. Example dimensions may include categories such as products for a region or sales for a region. In some implementations, the dimensions may define a plurality of data categories for attributes in a number of datasets. In general, dimensions can include two selection modes. The first selection mode can cause the dimension to be used as an axes (e.g., by country). The second selection mode can cause the dimension to be used as a filter (e.g., for Q3/2014 as Quarter/Year). For example, selecting a dimension can cause an axes or value to be modified within data depicted in interface 102. In this fashion, selecting dimensions can function to filter data. Dimensions may be stored and accessed from dimensions repository 118.

The example system 100 also includes a knowledge graph 112. The knowledge graph 112 may represent a hierarchically arranged platform in which to manage business data. This platform can be configured to organize and distribute business data for a particular organization. The knowledge graph 112 can function as a repository to be used to structure, simplify, and connect business data to users accessing such data. The data in the knowledge graph 112 may be aggregated from a variety of internal and external sources. In some implementations, the knowledge graph 112 includes metadata that defines a path to obtain a document that may be responsive to a particular search query. In this example, rather than store the data in the graph, the information for accessing the data is stored in the graph.

The knowledge graph 112 can access or provide access to a number of repositories including, but not limited to datasets repository 114, measures repository 116, dimensions repository 118, and metadata 120, which can be stored internal to the graph 112, external to the graph 112, or both. In general, the knowledge graph 112 may be implemented using any suitable software constructs. In a non-limiting example, the knowledge graph 112 may be constructed using object oriented constructs in which each node is a business object with associated functions and/or variables. Edges of knowledge graph 112 may represent business objects that have associated functions and variables. In some implementations, data contained in the knowledge graph 112 can be constructed of edges and nodes and can be stored in any suitable number of data repositories across one or more servers located in one or more geographic locations coupled by any suitable network architecture. As used herein, a business object refers generally to a construct of data and a methodology regarding how to interact with the data. The knowledge graph 112 can include business object data, metadata, and associating data for such business objects.

In some implementations, the knowledge graph 112 can include query trees configured to connect or be connected to other query trees by edges or nodes. The connections may be based at least in part on adherence to system or grammar rules. In some examples, the nodes may represent business objects with a number of functions and variables. The edges may represent similarities between one or more function or variable associated with at least two business objects connected by at least one edge.

The metadata 120 can include data associated with one or more datasets, measures, and/or dimensions. The metadata may describe semantic enhancements or enrichments to the datasets, measures, and/or dimensions. For example, a dataset can contain metadata that defines time and geography hierarchies, measures, formulas, and calculations, just to name a few examples.

The knowledge graph can include or have access to a modifiable grammar 122 and association rules 124 in which to build and update the graph 112, including building and updating nodes 126 in the graph. The grammar 122 may represent a set of association rules 124 (or other rules) that can be used to verify business intelligence semantics stored in the knowledge graph 112. In some implementations, the grammar 122 is located external to query management system 108. For example, the grammar 122 may be included as part of enterprise software application 106 within suggest query 138.

In one example, rules in the association rules 124 can be used to determine how each element of a search query can be connected to each other element using a specific set of relation types. Relation types can include parent nodes, child nodes, similar nodes based on keyword, business object overlap, business unit overlap, etc. The rules can be used to determine a path through the knowledge graph to connect each element of the search query can ensure that the system finds and joins conditions that can be performed to execute the query. Another example rule may include specific terms. For example, the keyword "current" may be associated with a rule in the grammar that states that "current" should be followed by an attribute with a time semantic (e.g., "current year" translates to "2015," or the actual current year). In some implementations, the grammar can be used to detect intent and modify particular visualization and/or query suggestion in the user interface 102. For example, a rule can be defined in the association rules 124 for the keyword combination "comparison of" This keyword combination can be associated with a rule that ensures at least two measures are used so that the system 108 can generate a bar graph/chart. Another rule may include specifying a drill path or a drill order used to follow a defined hierarchy order (e.g., by year, then by month, etc.). Additional example rules are shown with respect to FIG. 9 below.

In the example system 100, the query management system 108 also includes a query engine 134 and a security engine 136. In some implementations, the query engine 134 and/or the security engine 136 may be provided external to query management system 108.

A search query as used herein can be built by a user and can include one or more terms or questions that can be used to retrieve data from a dataset. In one example, the user can trigger the systems described herein to generate query objects in near real time. The generated query objects can be used to build a near real time query (e.g., an ad hoc query in a business intelligence category). Such a query can be generated based on semantic metadata stored in a knowledge graph. The generated query can be used to trigger return of information from one or more repositories. The retrieved information can be used to build answers to a particular received search query. The answers can be executed against business intelligence data models (e.g., view, dataset, Lumira documents, etc.) and can be displayed as a visualization of data in a user interface.

The query engine 134 can be configured to build and perform queries based on data provided in user interface 102, for example. The data provided in user interface 102 may be system-generated, user-entered, or a combination of both. In some implementations, the query engine 134 can be configured to determine a query context associated with data entered into interface 102 (or with respect to data presented in interface 102). Determining a query context can include using a combination of data and data sources to ascertain context from the data. For example, one way to determine the query context can include accessing a knowledge graph to compare the selected and displayed data from user interface 102 with data (e.g., nodes and edges) in the knowledge graph 112. The comparison can include determining associations between information stored in the knowledge graph and determining which of those associations are compatible with the data displayed in user interface 102.

In operation, the query engine 134 may be configured to generate a number of keyword search queries using one or more keyword tokens 132 that may be generated by receiving user input, such as a free text query or question in a search field. The query engine 134 can execute the keyword searches against a metadata repository and obtain search results responsive to the one or more keyword searches. Using the search results, the query engine 134 can generate several query trees (e.g., one for each token). Using the query trees, the query engine 134 can generate a list of search query suggestions. The query suggestions can be generated using the query trees to retrieve data corresponding to one or more rule compliant data paths defined by the query trees. The query suggestions can be provided to the user for selection. Selecting a query suggestion can trigger execution of a system-wide search for business data.

The security engine 136 can be configured to determine whether a user accessing user interface 102 (and thereby accessing content in systems/applications 106 or 108) is authorized to access particular data. For example, the security engine 136 can determine whether insufficient security credentials have been provided for a user of the software application. If the engine 136 determines that particular data cannot be accessed, the user interface 102 can be modified to exclude the data. That is, the security engine 136 can remove data from the interface 102 and/or, terminate view access to datasets, measures, dimensions, or any associated business objects.

In some implementations, the security engine 136 may be configured to implement security rules to allow or deny presentation of query suggestions to a user of the user interface, the security rules being based on user usage data, knowledge graph rules, and grammar rules. In some implementations, the security engine 136 may be configured to deny access to one or more query suggestions by removing the one or more query suggestions from a list of generated query suggestions before providing the list to a user. The denied access may be because the query engine 134 determined that insufficient user credentials are associated with the user accessing a user interface in the software application.

In some implementations, the security engine 136 can access information provided by entities wishing to access query management system 108. For example, such information can include security model information, metadata describing sources of such information, and access control list data to be indexed in index repository 128, for example. In addition, the actual access controls lists can also be indexed. For example, the query engine 134 can perform a search query according to user credential rules that allow secure access to a portion of repositories within an organization. The user credential rules may block particular repositories from being searched by the query engine 134 (via application/user interface 102) based on the user's access privileges.

In some implementations, the security engine 136 can be configured to determine an identity of a user accessing user interface 102 to determine historical usage metrics, in a usage metric repository 130, associated with the enterprise software application 106, or query management system 108. The usage metrics repository 130 may include historical data access, previously suggested queries and/or previously useredited queries, or a present query combined with the identification of the user. Determining user identification can include retrieving data about the user from login credentials or other repository storing user data. The retrieved data can be used to obtain the user's job title, management statistics, security groups, hierarchy within a group, etc.

Referring again to FIG. 1, the query management system 108 also includes (or has access to) enterprise software application 106. The enterprise software application 106 represents computer software used to satisfy the needs of a business organization. Enterprise application software 106 generally includes a collection of computer programs (i.e., software applications and repositories) with common business applications, tools for modeling how an organization functions, and development tools for building applications unique to the organization. The enterprise application software 106 can be used in combination with query management system 108 to improve enterprise productivity and efficiency by providing business logic support functionality and contextual query resolution.

Services provided by the enterprise software application 106 may include business-oriented tools such as query context management and search query management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The enterprise software application 106 shown here includes a suggest query service 138 and a knowledge graph API service 140. Both services 138 and 140 can be configured to manipulate user interfaces (such as user interface 102) using stored data from system 108. In particular, the suggest query service 138 can transform a user query or question into query descriptions over existing datasets and artifacts in enterprise software application 106 and/or query management system 108. An associated query service (not shown) can function to retrieve data corresponding to the suggested query and used to provide visualization of the data to a user. A visualization recommendation service (not shown) can be used to determine how a query could be properly visualized in a user interface. The suggested queries may be based on information stored in the knowledge graph 112. The knowledge graph 112 may be built from information that can be crawled from various data sources, or derived from usage.

The knowledge graph API service 140 can be provided to a number of entities that wish to utilize system 108 and application 106. Entities can provide information that can be uploaded to the knowledge graph 112 by sending information on a message bus. For example, to insert data into the knowledge graph 112, entities can send security model information, metadata describing the sources of information, and access control list data to be indexed as well as the access controls lists. In some implementations, the entities (e.g., source systems) may decide which information should be sent, and to which extent dimensions can be indexed. Information sent over the bus can be collected by dedicated collectors (not shown) that can store such information in the knowledge graph 112. The collectors may be deployable independently of one another to make scaling and graph updating convenient.

The query management system 108 in system 100 can be communicatively coupled to device 104. Device 104 can access system 108 and any associated software applications. Device 104 can be connected (wired or wirelessly) to system 108, which can provide business data, user interfaces, and facets for display. In some implementations, the computing device 104 can execute one or more applications on the query management system 108 and provide business content and/or services to computing device 104.

In some implementations, one or more additional content servers and one or more computer-readable storage devices can communicate with the computing devices 104 and 108 using network 110 to provide business content to the client device 104 and/or system 108. In some implementations, the network 110 can be a public communications network (e.g., the Internet, cellular data network, dialup modems over a telephone network) or a private communications network (e.g., private LAN, leased lines). In some implementations, the computing devices 104,108 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1, the example system 100 may include a plurality of computing devices that can exchange data over a network 110 (or additional networks not shown). The computing devices hosting client device 104 and/or system 108 may represent clients or servers and can communicate via network 110, or other network. Example client devices may include a mobile device, an electronic tablet, a laptop, or other such electronic device that may be used to access business content from query management system 108. Each client device can include one or more processors and one or more memory devices. The client devices can execute a client operating system and one or more client applications that can access, control, and/or display business data on a display device included in each respective device. The query management system 108 may represent a server device. In general, the query management system 108 may include any number of repositories storing content and/or business software modules that can search, generate, modify (e.g., edit), or execute business software and associated business objects, data, and knowledge graphs.

Additional devices are possible and such devices may be configured to be substituted for one another. In some implementations, the devices 104 and 108 can be laptop or desktop computers, smartphones, personal digital assistants, portable media players, tablet computers, gaming devices, or other appropriate computing devices that can communicate, using the network 110, with other computing devices or computer systems.

In operation of system 100, a user can pose a query/question in interface 102 and receive one or more answers in the form of raw data, visual/graphical data, and/or other data format. The answers can be provided by query management system 108. In a non-limiting example, the query management system 108 can build a set of consistent queries using rich business intelligence semantic information, syntactic keyword rules, combination rules and security rules, and can do so with near real time performance.

In short, the system 108 can receive a textual data from a user accessing interface 102 and can use the query to access the grammar 122. The system 108 can use the grammar 122 and the received data to generate a set of consistent queries. The text in the data can be analyzed and tokenized (i.e., portioned into tokens 132), and associated to keywords if a matching textual query portion can be found in the grammar. In some implementations, the matching can be performed using a Levenshtein distance algorithm to resist account for typing errors. Other approximating algorithms can of course be substituted. The system 108 can attempt to match each token (including keywords) against the metadata using a full text search engine, such as query engine 134 or an external search engine. The matches can be combined using predefined association rules (e.g., association rules 124) as a default. In some implementations, the rules may include particular rules associated with the received/detected keywords. Combining the matches can include generating a tree/graph in which nodes 126 of the graph 112 represent matched metadata or keywords item, (or a node to mark a non-matched item). A new node can be added as a child node if an existing node satisfies the applied rules.

Upon applying the rules, the system 108 can select a number of generated queries that appear to be within the same context and relevancy as the user entered textual data (i.e., by analyzing the score). The suggested queries can be translated to a human readable format and a translated to a query that can be accessed by query service 138, for example. The translation can be performed using the grammar keywords to express the interpreted semantic. The human readable format of the suggested queries can be provided to the user of interface 102, while the machine-readable query can be provided to suggest query service 138. The user can select which query suits his needs.

In general, a path from the root of the graph 112 to a leaf may represent a query that has been judged consistent by the system 100. The above process can be used to generate several consistent queries that can be scored using a cumulative search score for each individual item.

In some implementations, the system 108 can clip tree/graph sizes to avoid a combinatorial explosion of the number of queries generated. For example, the system 108 may store only the best N queries (e.g., 25-50 queries) for each level of the tree.

The system 100 can provide the advantage of an easy to use full text search to generate consistent queries/query objects without user action. The queries may be expressive of data in repositories and include keyword and grammar support. In addition, the system 100 can provide the advantage of ranking such queries. The system 100 may also be fault tolerant with respect to typing and semantic errors. The system 100 may provide incremental learning for a user because the user can reuse keywords presented in previous query suggestions that the user received.

Figure 2:
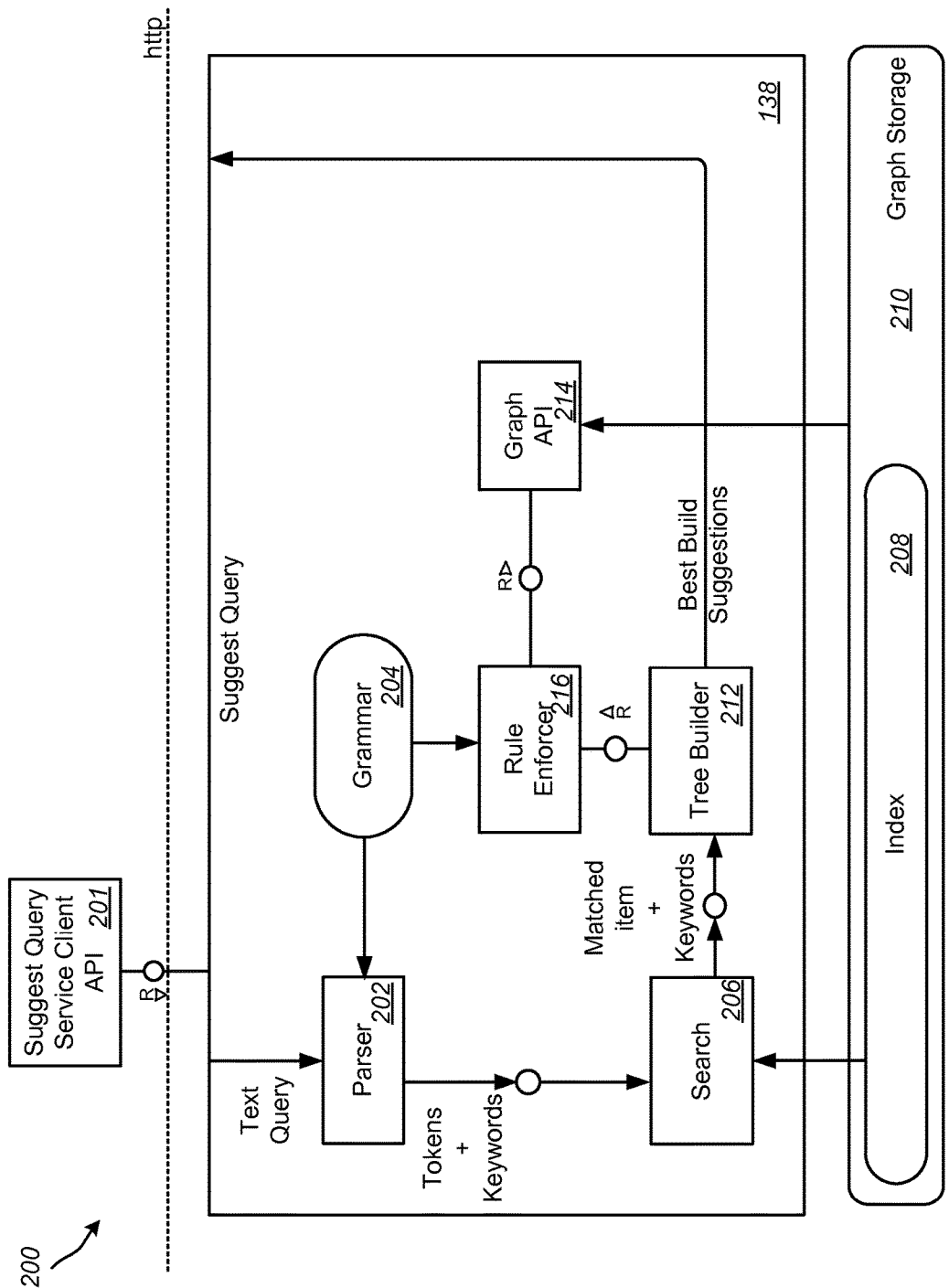
FIG. 2 is a flowchart illustrating example operations of the system of FIG. 1.

FIG. 2 is a flowchart 200 illustrating example operations of the system of FIG. 1. Operations 200 can be performed by suggest query 138 to assist a user attempting to retrieve data from an enterprise software system. For example, in operation of system 100, a user can pose a text query via suggest query service client API 201 and a parser 202 can receive the query. The parser 202 can use the grammar 204 and the text query to tokenize (i.e., portion into tokens) the text and to find matching keywords for the tokens. The system 108 can attempt to match each token (including keywords) against the metadata using a full text search engine using a search engine 206. The search engine 206 can access data index 208 in graph storage 210 to associate tokens to a list of items, such as measures, dimension, and/or values. The knowledge graph/tree can be built using tree builder 212. Grammar rules can be verified using semantic information stored in the graph API 214. In some implementations, matched tokens can be combined using predefined association rules in rule enforcer 216. In some implementations, the rules may include particular rules associated with the received/detected keywords. Combining the matches can include generating a tree/graph in which nodes 126 of the graph 112 represent matched metadata or keywords items. In general, a partial list of top candidates for query suggestions are stored. These top candidates can be returned to the user. In some implementations, security rules using graph API 214 can be applied each time stored information is accessed. In some implementations, a number of rules can be checked using a business intelligence semantic stored in the knowledge graph utilized to provide search query suggestions.

Figure 3A:
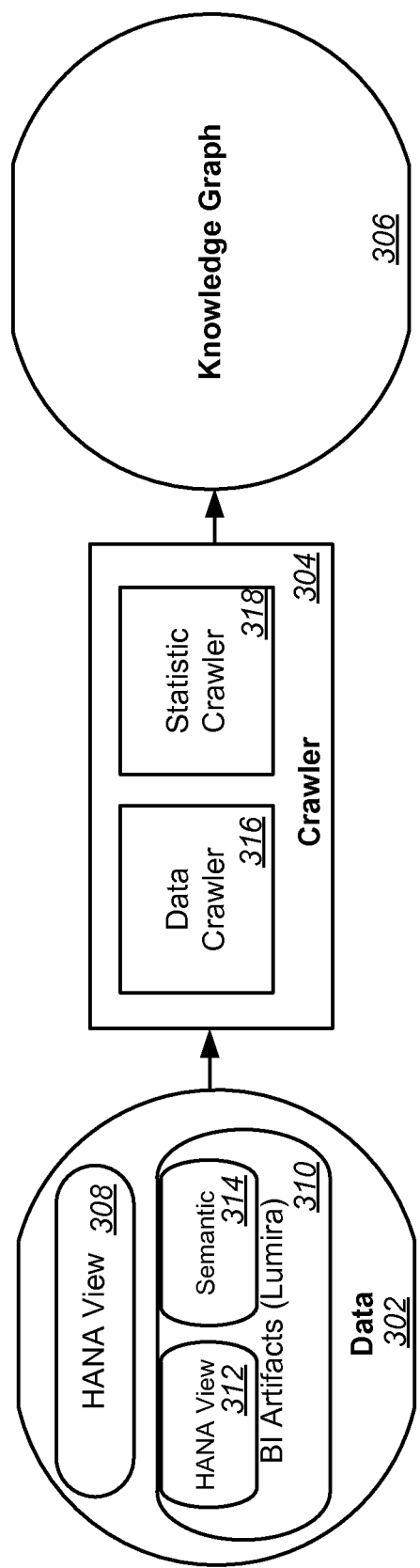
FIGS. 3A-3B represent data flows used to generate a knowledge graph.
Figure 3B:
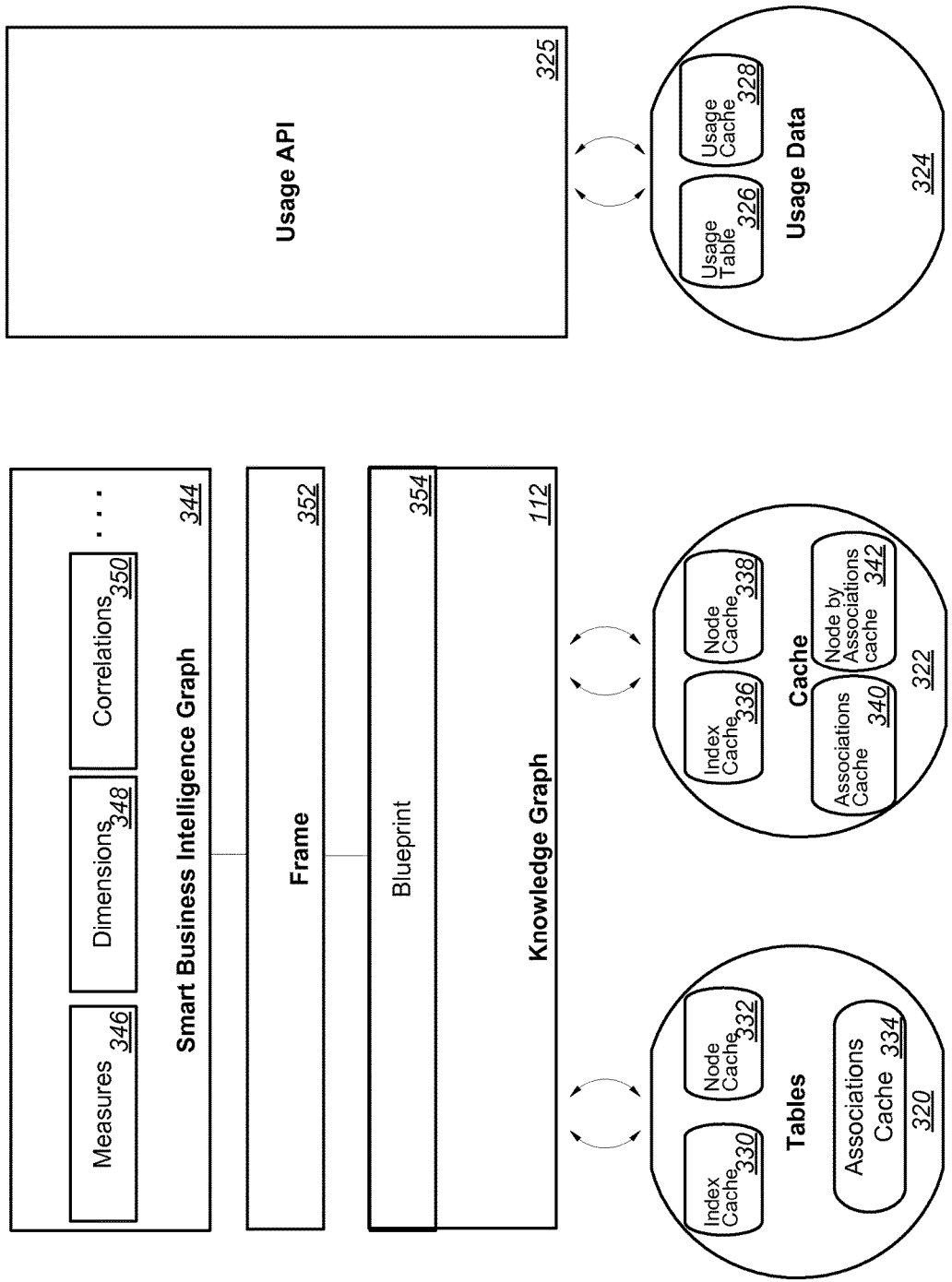

FIGS. 3A-3B represent data flows used to generate a knowledge graph. As shown in FIG. 3A, the system 100 can crawl (or otherwise obtain) data 302 using a crawler 304 to generate the knowledge graph 306. In general, the knowledge graph 306 can be built using statistics, usage data, dimension data, and measure data obtained from data 302 by linking the data 302 together via nodes and edges based on similarity and context. The data shown here includes a HANA repository 308 and a business intelligence artifacts repository 310 (e.g., Lumira). The business intelligence artifacts repository 310 includes a HANA View 312 and a semantic view 314. In general, metadata and/or semantic information, as well as data from Dimensional attributes, for example, can be extracted from data 302. The extracted content can be mapped as shown in FIGS. 3A and 3B into the knowledge graph model depicted in FIG. 4. In one example, the dataset 114 (could be a HANA View or a Lumira document) can be mapped to EntitySet 404. Similarly, the measure 116 can be mapped to measure 420. The dimension 118 can be mapped to dimensional attribute 424 and detail 422 while metadata 120 can be mapped to entities 426, 430, 432, 428, 434a, 434b, 436, 440, as indicated by connecting arrows shown in FIG. 4. The HANA View may include dimension, dimension attributes, measures, hierarchy, etc. Such information may be publically available on the Internet. The semantic may exist to explain that the system 100 can leverage additional metadata and/or semantic data, for example, on business intelligence artifacts, such as visualizations, query, story, etc. In some implementations, cache 322 may represent an engineering pattern used to improve performance via caching.

The crawler 304 includes a data crawler, a metadata crawler 316, and a statistic crawler 318. The data crawler 316 can crawl repositories in system 100 to gather information from any number of datasets being crawled via a preconfigured scheduler. In some implementations, the crawl can be performed in real time and a dataset can publish content in the knowledge graph during execution of a query, for example. The statistic crawler 318 can crawl repositories in system 100 to access statistical metrics and information. Such information may be stored in the knowledge graph 306 (e.g., knowledge graph 112) as edges and vertices/nodes that inherit respectively from the interfaces.

As shown in FIG. 3B, additional data can be accessed to generate knowledge graphs. The graph model shown here may be used to assess compatibility between datasets. The model includes system-stored tables 320, caches 322, and usage data 324 that can access a usage API 325. Usage data 324 can function to sort data (provided as search results) based on user usage data. This can ensure the user can easily access information often utilized by the user. The usage data 324 includes a usage table 326 and a usage cache 328. The usage table 326 may include scores indicating usage statistics and usage information about a user accessing system 108, for example. Usage data 324 and/or usage cache 328 may represent the usage of each object. Usage data 324 can be used to sort an object.

The tables 320 include an index cache 330, a node cache 332, and an associations cache 334. The index cache 330 may be used to store attribute instances and tags pertaining to business objects associated with enterprise software application 106. The nodes cache 332 may be used to store particular graph nodes. The associations cache 334 may be used to store relationships between the nodes 332.

The cache 322 includes index cache 336, node cache 338, associations cache 340, and node by associations cache 342. The cache 322 components 330-342 include data that can be quickly accessed by the system 108. The cache 322 includes the node by associations cache 342, which can be configured to store all nodes for an association.

The smart business intelligence graph 344 can include all interface information for graph elements including, but not limited to measures 346, dimensions 348, and correlations 350. For each component 346-350, the system can store a full text index for a dataset name, measure name, dimension name and dimension values in order to handle homonymy via name merges. For example, the system 108 can access the tables index 320 and cache index 322 to merge common names for datasets so that one dataset can be presented to the user without repetitively providing datasets with the same name across many business objects and business units.

The smart business intelligence graph 344 can provide data via a frame 352 to the knowledge graph 112. The frame 352 may represent an API that overcoats the knowledge graph 112. The knowledge graph 112 generally includes nodes and associations (not shown) that allow traversal of information in the graph to find compatible associations. For example, the query management system 108 can traverse the knowledge graph 112 in order to calculate compatibility/link-ability of nodes in the graph for particular workflows. The workflow may pertain to a link that associates a dataset to a measure or dimensional attribute. The link can be used to join data by associating the different columns and key of particular joins. By using a path finder between elements, the system 100 can trace the knowledge graph 112 to obtain a clear and valid data path between two elements in the graph. If a clear and valid data path cannot be obtained, the system 100 may conclude that the elements along such a path are not compatible.

A blueprint 354 is shown connected to knowledge graph 112. The blueprint can be used to create and manage the graph. In some implementations, the blueprint 354 may be used to build an implementation of FRAME on HANA.

Figure 4:
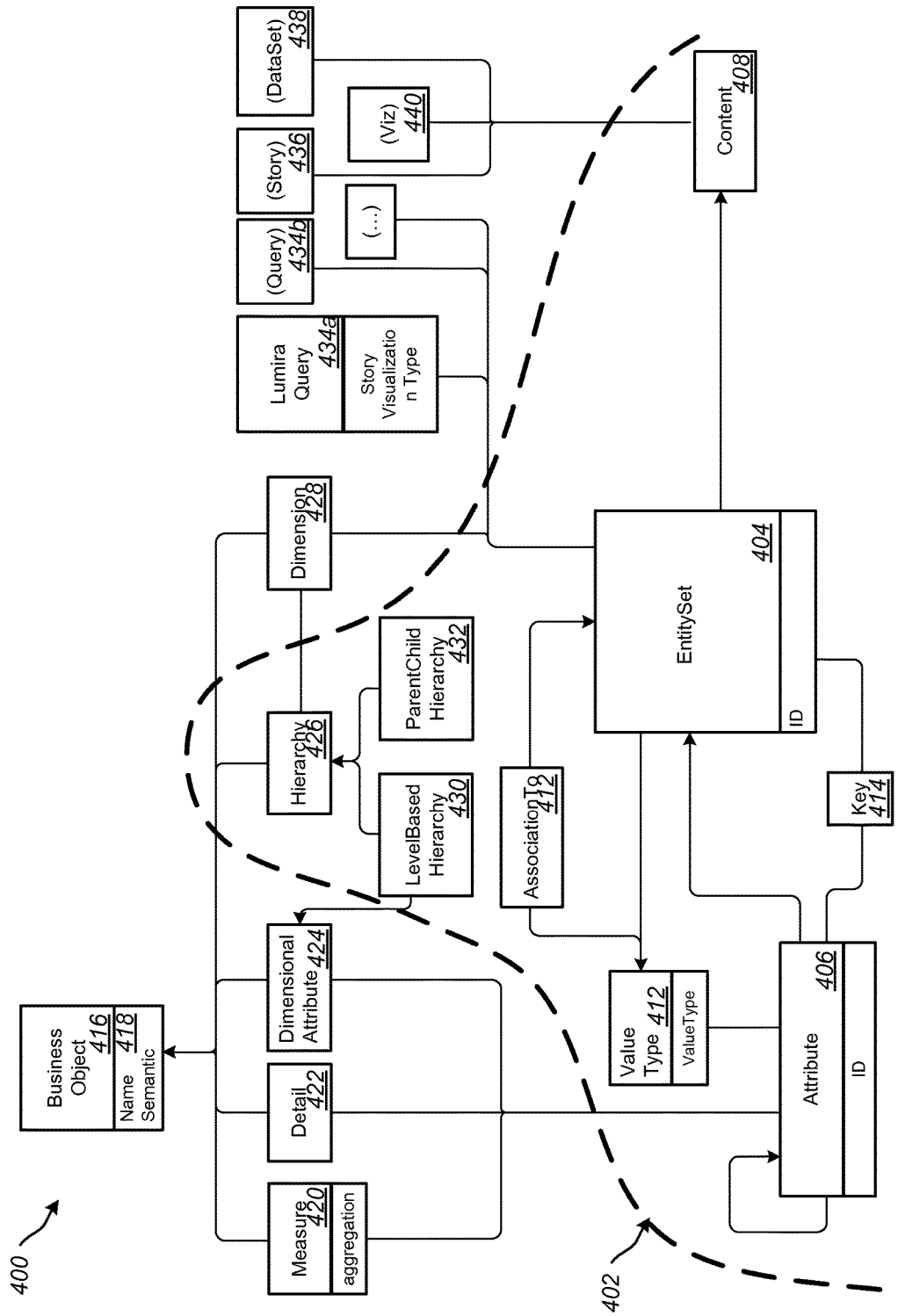
FIG. 4 is a semantic model illustrating an example of information used to generate a knowledge graph.

FIG. 4 is a semantic model 400 illustrating an example of information used to generate a knowledge graph. The model 400 may be used to determine whether two datasets can be merged/blended and provided as a combined dataset in a visualization/user interface. In general, the model 400 can enable information to be managed through full text indexes, nodes, and associations.

The semantic model 400 includes a base model shown below a dotted line 402 and an annotations model, shown above the dotted line 402. The base model may describe structured entity sets. Entity sets may represent sets of entities with a common structure. In practice, the entity sets may include or be represented by tables, views, and queries. Entities may represent records made from attributes (e.g., columns, fields), which themselves can be entity sets within their own structure. Example entity types may include string or integer, and each type can be seen as specific entity sets. Entity sets may be associated with keys (i.e., a subset of their attributes). An entity set with no key may be represented as a singleton.

The annotations model may represent a semantic layer on top of the base model, and can expose notions such as measures (i.e., attributes with an aggregation function), details (i.e., attributes which are not key, and thus can be viewed as a function of the key attributes of their entity set), dimensional attributes (i.e., used as associations to dimensions, as levels in hierarchies). In some implementations, attributes and entity sets may be annotated multiple times. Content nodes are included in the annotations model to represent specific containers to represent entity set instances.

As shown in FIG. 4, there are three node types, namely, entity sets 404, attributes 406, and content 408. When attributes are of type entity set, the information about their structure can be merged with the attribute "InnerEntitySet."

In some implementations, annotations and attributes appear collapsed because there may typically be one annotation for one attribute. In the event that the system 100 wishes to use more than one annotation for an attribute (an attribute that can be seen both as a measure and a dimension for instance), the system 100 can create aliases. Associations may be represented through a node associated with the attributes of each entity set that materialize the association (e.g., a foreign key in SQL with input columns mapped to a key).

As shown in the semantic model, attributes 406 can each include an identifier and can use notation to keep track of an origin of particular values and/or value types 410. The value type can target one or more entity sets 404 using association data 412. The attributes 406 can be cast onto entity sets 404 and keys 414 can be generated.

Business objects 416 may include name semantics, which can be determined and or defined by aggregated measures 420, details 422, dimensional attributes 424, hierarchies 426, and/or dimensions 428. Hierarchies 426 can receive data from level based hierarchies 430, as well as parent child hierarchies 432. Level based hierarchies 430 can provide data to define dimensional attributes 424.

Queries 434a and 434b, stories 436, and datasets 438 can be retrieved and/or received by system 108, for example. The received or retrieved data can be used to visualize 440 a query context to provide relevant content 408 to a user of user interface 102.

When model elements are transferred to clients, the following syntax (JSON serialization) may be used to describe model elements. Capitalized names correspond to non-terminals in the grammar (described later as NONTERMINAL:= . . . ). Field names followed by "?" are optional. Elements enclosed in square brackets are lists. The "with" syntax indicates that the new element extends/overrides the other with the specified information. The code snippet below shows an example of such syntax.

```
ENTITY_SET := {
    id?: ENTITY_SET_ID, // not used for inner entity sets
    type: ENTITY_SET_TYPE,
    kind?: ENTITY_SET_KIND, // not used for inner entity sets
    name?: string, // not used for inner entity sets, indexed
if present
    connectionId?: string // name of the connection giving access to the entity set
(should be usable by the query service)
    // not used for inner entity sets
entitySetId?: FQN, // Fully Qualified Name of the dataset in the system
identified by the connectionId
    // In Hana, this corresponds to the repository id of the view
    // Not used for inner entity sets
sqlId?: FQN, // Fully Qualified Name of the table/view, as used in a SQL query
(including schema information)
    // Not used for inner entity sets
    attributes: [ ATTRIBUTE_ID ],
    associations: [ ASSOCIATION ],
    keys?: [ KEY ] // no key => tuple set; empty keys:
```

```
singleton ; keys: indexed entity set
        <property> : <value> // represent "other" properties of the
entity set, stored in the graph
}
ENTITY_SET_ID := FQN // Fully Qualified Names correspond to the
id in the original system
ENTITY_SET_TYPE := "dataset" | "innerEntitySet" // dataset is used for top-level
entity sets
ENTITY_SET_KIND := "analyticView" | "attributeView" | "dimension" | "bi.query++" | ...
ATTRIBUTE := {
        id: ATTRIBUTE_ID,
        type: ATTRIBUTE_TYPE,
        name: string, // indexed
        valueType: ATTRIBUTE_VALUE_TYPE,
        uses: [ USES ],
        entitySet: FQN, // ENTITY_SET_ID or ATTRIBUTE_ID representing the defining (inner) entity
set
attributeId: LN, // attribute Local Name (id) in the entity
set
// only for inner entity sets
        attributes?: [ ATTRIBUTE_ID ],
        keys?: [ KEY ] // no key => tuple set; empty keys:
singleton ; keys: indexed entity set
        <property> : <value> // represent "other" properties of the
attribute, stored in the graph
}
ATTRIBUTE_ID := FQN
ATTRIBUTE_TYPE := "measure" | "dimensionalAttribute" | "detail"
ATTRIBUTE_VALUE_TYPE := string | integer | double | float | fixed | date | time |
entitySet
USES : {
        attribute: ATTRIBUTE_ID,
        isEqual: boolean
}
KEY := [ ATTRIBUTE_ID ]
BO := {
        id: string,
        name: string, // indexed
                isAlias: true, // overridden by attributes
        aliasOf?: FQN, // iff isAlias is true
        <property> : <value>
}
MEASURE := BO with {
        type: "measure",
        semantic?: SEMANTIC,
        aggregation: AGGREGATION
}
MEASURE_ATTRIBUTE := MEASURE_BO with ATTRIBUTE with {
        isAlias: false
}
AGGREGATION := "sum" | "count" | "min" | "max" ... // to be refined
DIMENSIONAL_BO := BO with {
            type: "dimensionalAttribute",
semantic: SEMANTIC,
        hierarchies: [ HIERARCHY_ID ]
}
```

In some implementations, the end results of adding elements in the query context is a query generation into an SQL Statement (or similar language) that could be executed by a query execution engine in order to get the result from a repository.

Code Snippet I

```
DIMENSIONAL_ATTRIBUTE := DIMENSIONAL_BO with ATTRIBUTE with {
        isAlias: false
}
DETAIL_BO := BO with {
        type: "detail",
        semantic: SEMANTIC
}
DETAIL := DETAIL_BO with ATTRIBUTE with {
        isAlias: false
}
```

Code Snippet I

```
ASSOCIATION := {
    sourceAttributes: [ ATTRIBUTE_ID ]
    target : FQN,
    targetKey : KEY
}
SEMANTIC := "geo" | "time" | "label" | ... // to be detailed
HIERARCHY := {
    id: HIERARCHY_ID,
    type: HIERARCHY_TYPE,
    name: string // indexed
    <property> : <value>
}
HIERARCHY_ID := FQN
HIERARCHY_TYPE := "lbh" | "pch" // specific features of hierarchies are
described below
LEVEL_BASED_HIERARCHY := HIERARCHY with {
    type: "levelBasedHierarchy",
    levels: {
        <LEVEL>: ATTRIBUTE_ID
    }
}
CONTENT := {
    id: CONTENT_ID,
    type: "content",
    kind: CONTENT_KIND,
    name?: string, // indexed if present
    <property> : <value>
}
CONTENT_KIND := "visualization" | "story" | ... // to be refined
BUSINESS_OBJECT := MEASURE | DIMENSIONAL_BO | DIMENSION | DETAIL |
LEVEL_BASED_HIERARCHY | MEASURE_ATTRIBUTE | DIMENSIONAL_ATTRIBUTE |
DETAIL_ATTRIBUTE
```

Figure 5:
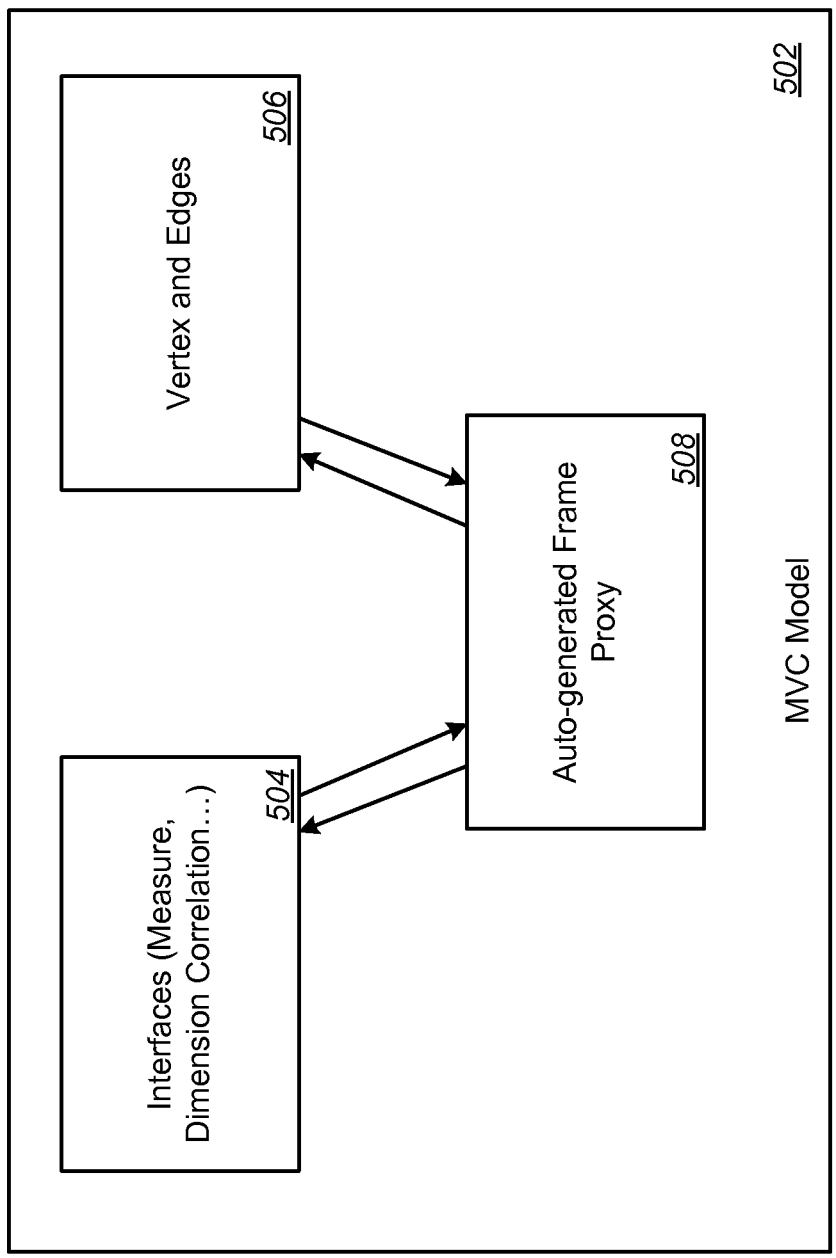
FIG. 5 is a block diagram of an example model used to implement a knowledge graph.

FIG. 5 is a block diagram of an example model used to implement a knowledge graph. The model shown here illustrates a Model View Controller (MVC) model 502. The MVC model 502 is typically controller-based and can provide a distinction between application logic and presentation logic in software applications. In particular, the MVC model 502 can be used to clearly organize and structure graphical user interfaces according to logical units. As shown, interfaces 504 and vertex/edges 506 can send and receive data from auto-generated frame proxy 508. In some implementations, the knowledge graph 112 may be implemented with the MVC Model. The model may pertain to the vertex and edges 506 of the graph. Vues may refer to interfaces used to create graph elements. Controllers may be proxy auto-generated by the frame.

Figure 6:
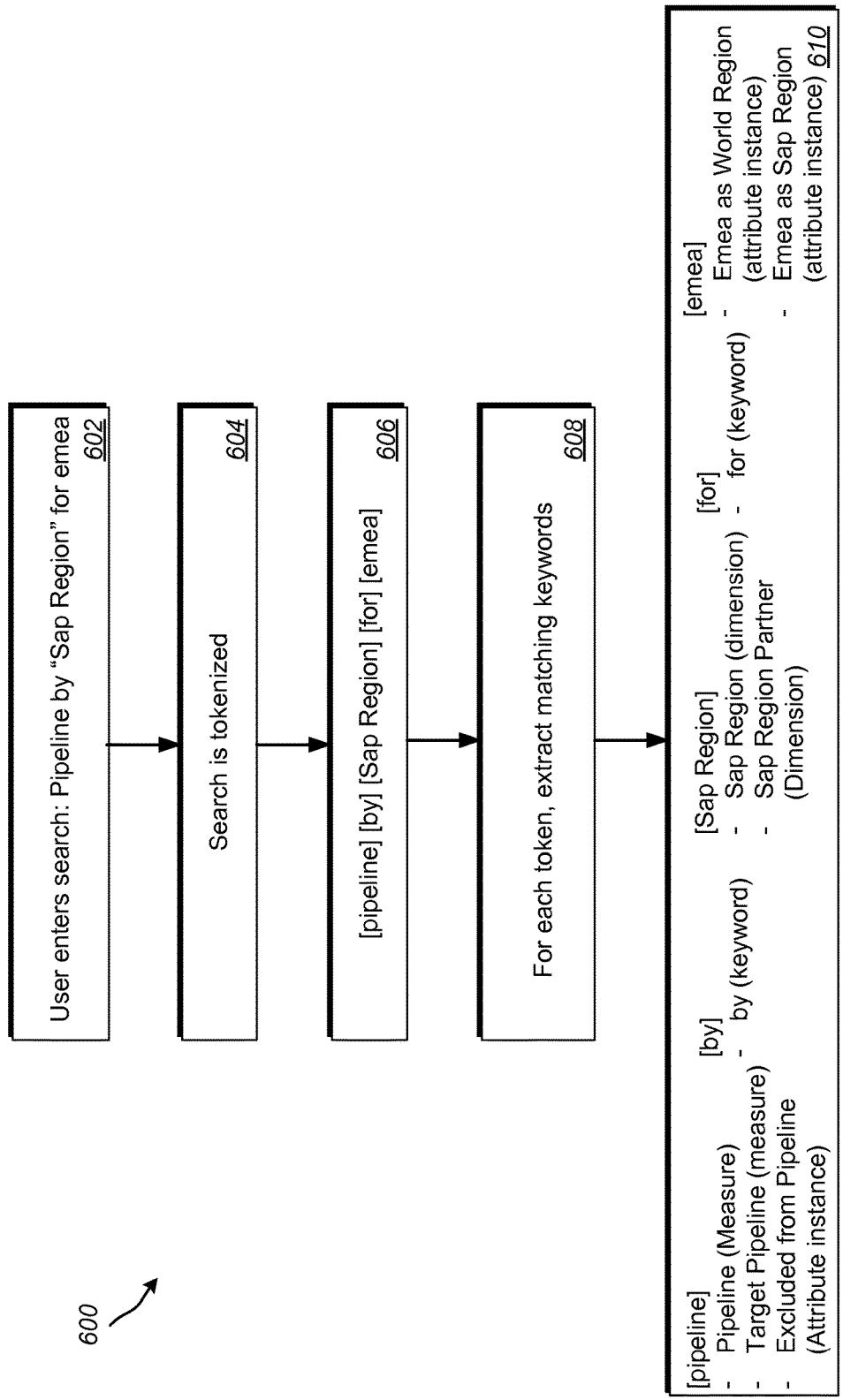
FIG. 6 is a flowchart screen shot illustrating example operations for building query suggestions within business software executing at a client device.

FIG. 6 is a flowchart screen shot illustrating example operations 600 for building query suggestions within business software executing at a client device. Operations 600 can be used by system 108 to build a plurality of query suggestions for a user that entered a search query in user interface 102, for example. In short, a query text (e.g., search query) can be received and can be decomposed into terms and matched against metadata using a classical search engine and/or indices. The result can be combined using custom combination rules and rules associated with detected keywords. This can be performed to generate several consistent search queries that can be scored using a cumulated individual search score for each. The top search queries can be provided to the user as search query suggestions. The queries can be built using a tree, in which each node of the tree is an object (metadata or keyword) and other objects are added to the query (a new leaf is added to the node) if the result query is consistent with the set of predefined rules. The scoring of suggestions can be performed by combining a search score for individual items. Other sources can be added, such as usage metrics that can be used to modify the scoring and ordering.

As shown in FIG. 6, a user can enter (602) a query such as "Pipeline by SAP Region for emea" indicating that the user wishes to access a metric named pipeline according to region, and in particular, with attention to region EMEA (i.e., Europe, Middle East, and Africa). The system 108 can tokenize (604) the terms in the search, resulting in the phrase split (606) into separate keywords. The system 108 can perform a search (608) to attempt to match each token in one or more repositories (e.g., datasets repository 114), measures repository 116, dimensions repository 118, index repository 128, usage repository 130, tokens repository 132, metadata 120, etc.). The system 108 can take one or more of the matching results for each token and provide suggestions for search queries. For example, for the term "pipeline," the system 108 found the measures "Pipeline" and "Target Pipeline" as well as an attribute instance of "Excluded from Pipeline." Similarly, for the term "by", the system may have detected a known keyword "by" to associate content and similarly for the term "for." For the term "Sap Region," the system 108 found the dimensions of "Sap Region" and "Sap Region Partner." Similarly, for the term "emea," the system 108 found attributes instances "Emea as World Region" and "Emea as Sap Region."

Any or all matched phrases/terms can be provided to the user as a suggested search query. Each of the provided suggestions may be associated with a score. In this instance, the measure "Pipeline" may be placed first in the list of suggestions 610 because the term best matches an entered term or context of the term. The term "by" may not be placed in the list of suggestions 610 because the term does not pertain to the searchable content.

In general, rules can determine particular scoring methods. For example, if a rule of "by" is not respected in any of the options, the system 108 may still return a suggestion since by may not be contextually relevant in the query. Similarly, if a partial match provides relevant content, the content associated with the partial match may be provided.

Figure 7:
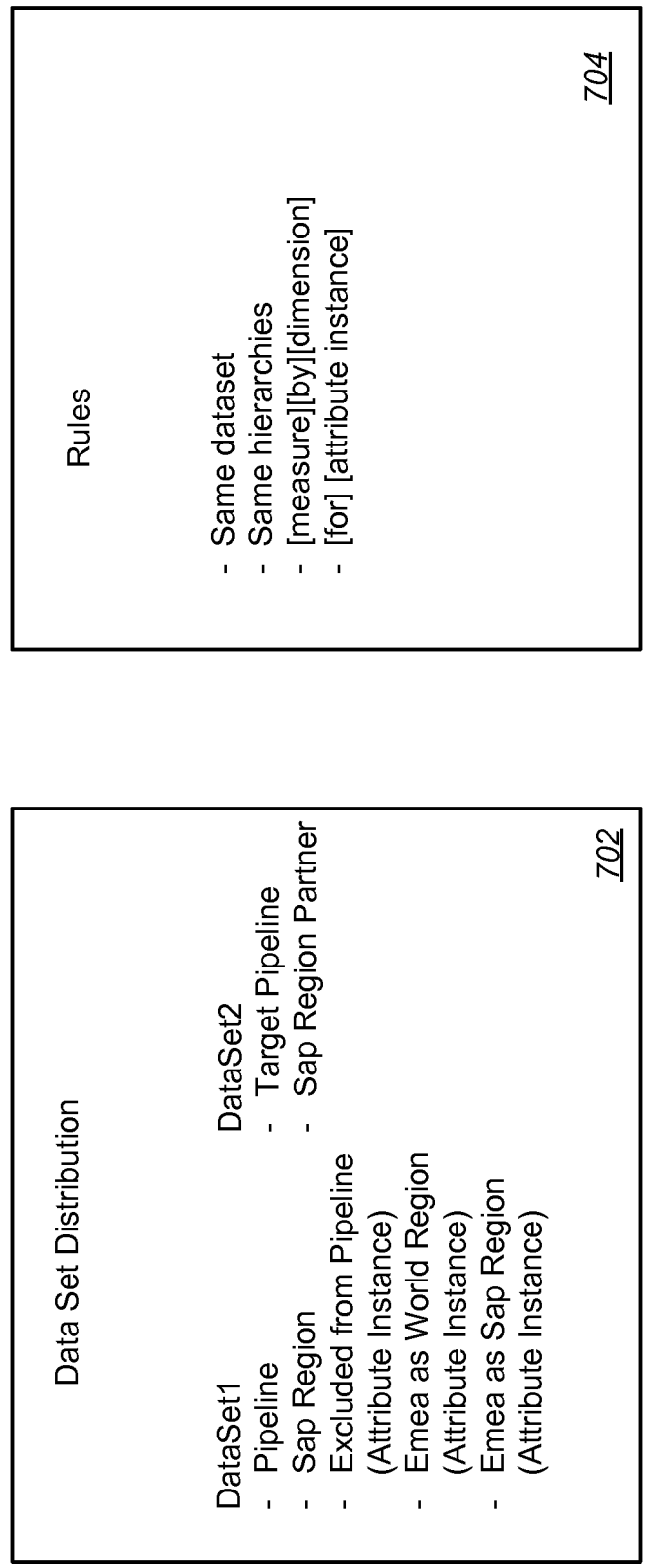
FIG. 7 is an example block diagram depicting a data set distribution and associated rules.

FIG. 7 is an example block diagram depicting a data set distribution 702 and associated rules 704. In this example, a first dataset (e.g., DataSet1) includes the terms "Pipeline," as Measure, "Sap Region" as dimension, "Excluded from pipeline" (as an attribute instance of "DRM Category"), "EMEA" (as an attribute instance of "World Region"), and "EMEA" (as an attribute instance of "SAP Region"). In general, "DRM Category" and "World Region" are also dimensions. The second dataset also includes "Target Pipeline" as Measure and "Sap Region Partner" as dimension.

The rules 704 being applied to the dataset distribution 702 includes the following rules. (1) Terms(s) shall reside in the same dataset in order to be combined and suggested as a possible search query, or to be combined and depicted as visualizations in a user interface. (2) if some terms belong to a hierarchy, they shall be listed in the same hierarchy level in order to be combined and suggested as a possible search query, or to be combined and depicted as visualizations in a user interface. (3) Term(s) shall take the syntax of [measure] [by][dimension] to invoke rules associated with the "by" keyword. (4) Term(s) shall take the syntax of [for][attribute instance] to invoke rules associated with the "for" keyword.

FIGS. 8A-8F illustrate an example of building query suggestions. The following description pertains to the dataset distribution 702 and rules 704 described in FIG. 7 above. As such, in this example, a user has typed text into user interface 102 "Pipeline by Sap Region for emea." The system 108 begins to tokenize, search, and suggest relevant search queries to the user based on the user-entered text.

As shown in FIG. 8A, the system 108 begins to parse the user-entered text "Pipeline by Sap Region for emea." The parsing can include dividing each term into a token and performing additional searches to find keywords matching each tokenized term. In this example, the first token includes the term "Pipeline," which the system 108 recognizes as a type of measure. The system 108 can find keywords in the grammar 122 or other repository. In the depicted example, the system 108 found the keywords "Pipeline," (802) "Target Pipeline," (804) and "Excluded From Pipeline" (806), as described above. With the keywords, the system 108 can begin to build a tree, which may represent a portion of knowledge graph 112, for example. The tree may be generated based at least in part on rules 704 enforced by system 100, or other rules such as association rules 124. Here, the system 108 initiated the tree with a first node (or leaf) for each matched keyword to produce leaf 802, leaf 804, and leaf 806.

Figure 8B:
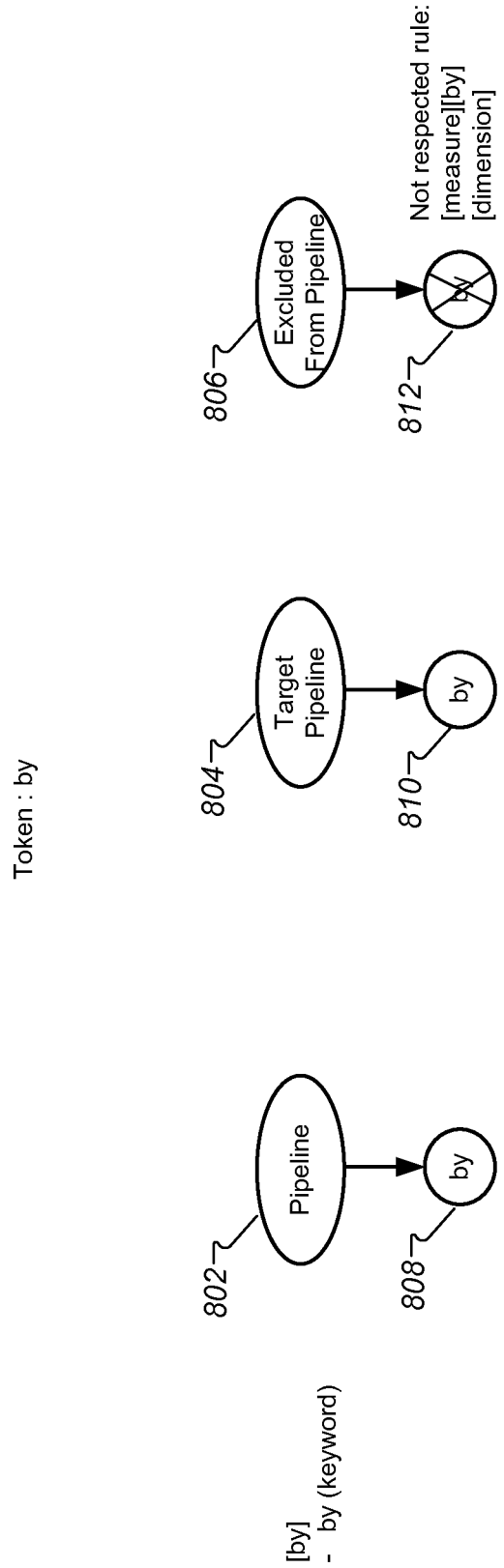

As shown in FIG. 8B, the second keyword of "by" can be compared to a number of system rules for the recognized keyword. FIG. 7 indicated a rule for the keyword "by" that specified that "by" is used to describe a measure [by] a dimension. Accordingly, the leaves/nodes in the tree for "Pipeline" and "Target Pipeline" can be extended with a new leaf (leaf 808 and leaf 810, respectively) for "by," while the attribute instance "Excluded From Pipeline" can be considered incompatible with the keyword "by" according to the rule. The leaf 812 is thus shown stricken from the tree. Striking a node or leaf from the tree indicates that the path is not possible and data may not be retrieved along the broken line.

As shown in FIG. 8C, the keyword "Sap Region" is analyzed by system 108. According to the rules 704 in FIG. 7, the keywords being connected shall be part of a common (e.g., same) dataset. Here, the keyword "Sap Region" can be added as a leaf 814 for keyword "Pipeline" 802 and "Excluded from Pipeline" 806 because they exist in the same dataset (i.e., Dataset 2). However, the keyword "Sap Region Partner" is not part of the same database and as such, cannot be added as a leaf, as shown by stricken leaf 816 and leaf 824. Similarly, keyword "Sap Region" is not part of the same dataset as "Target Pipeline," and as such, leaf 818 is stricken from the tree. In this example, keyword "by" shown by leaf 812 is stricken, and removed from the tree. Instead, leaf 806 can be directly connected to additional leaves if the system rules are not violated.

As shown in FIG. 8D, the keyword "for" is analyzed by system 108/According to the rules 704 in FIG. 7, the keyword "for" is used to describe an attribute instance. Leaf 828 is stricken based on "Sap Region Partner" not being part of the same dataset as "Pipeline." Leaf 830 is stricken because "Sap Region Partner" is not an attribute instance. The other leaves/keywords 826, 832, 834, and 836 abide by the system rules 704 and accordingly, new leaves were generated.

Figure 8E:
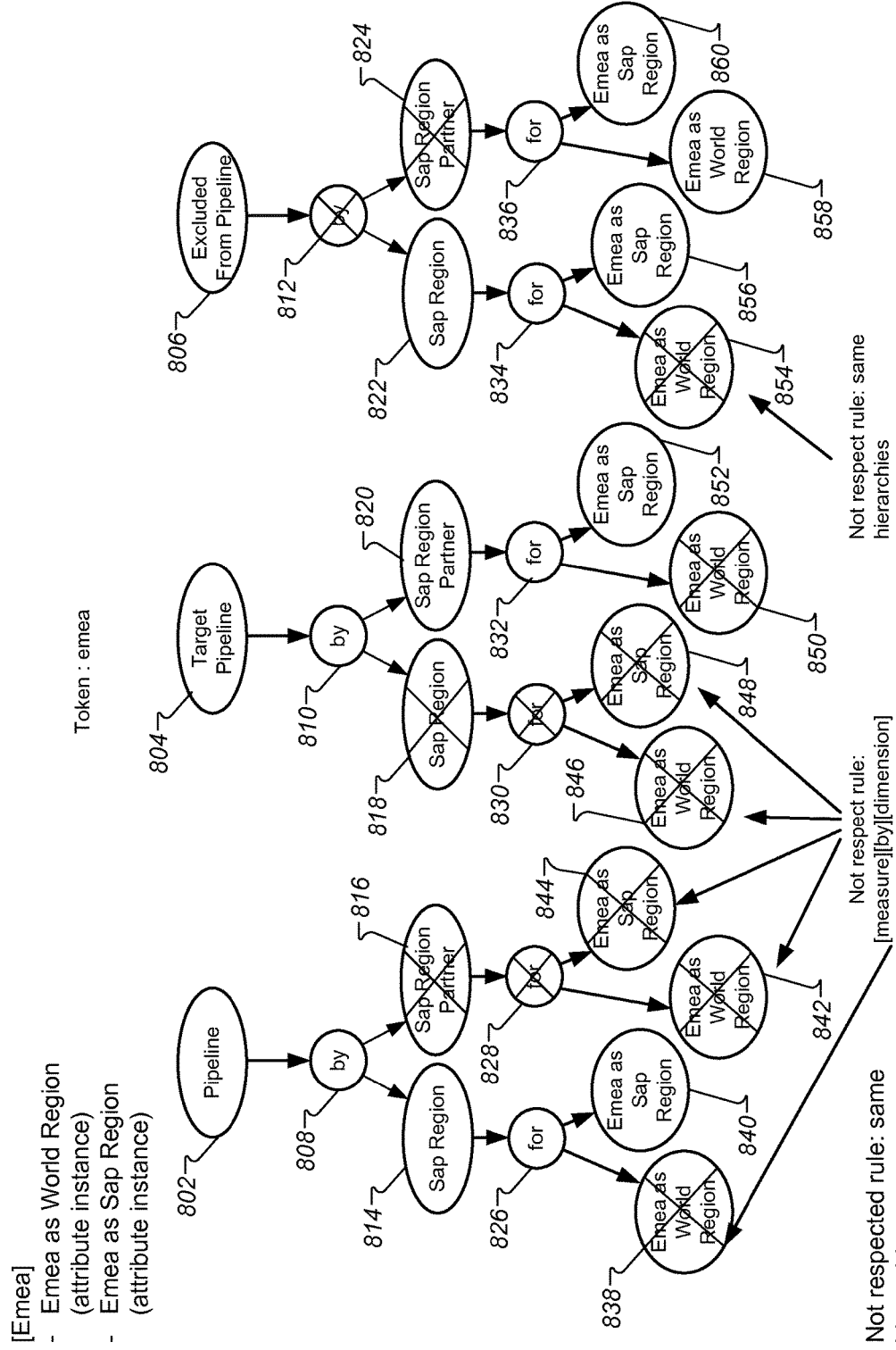

As shown in FIG. 8E, the keyword, "emea" is analyzed by system 108. According to the rules in FIG. 7, keywords being connected shall be from the same hierarchy level. The keyword "Emea as World Region" is stricken, shown at leaves 838, 842, 846, 850, and 854, while remaining part of the tree at leaf 858. Similarly, the keyword "Emea as Sap Region" is stricken, shown at leaves 844 and 848, while remaining part of the tree at leaves 840, 852, 856, and 860. Each leaf that is shown stricken can be shown to have broken one or more of rules 704.

As shown in FIG. 8F, each path that offers a leaf to a root is a possible query suggestion, shown by areas 862, 864, and 866. For example, area 862 indicates that a query suggestion can be provided that includes the phrase "Pipeline by Sap Region for Emea as Sap Region." Note that another system rule may have been introduced to substitute "for" from the original request to "as." This can be presented to the user in the form of a suggested search query and the user can learn that proper syntax includes the term "as" before inserting a particular attribute, measure, or dimension. Area 864 indicates that a query suggestion can be provided that includes "Sap Region for Emea as Sap Region for Excluded From Pipeline as DRM Category."

Similarly, area 866 indicates that a query suggestion can be provided that includes "Excluded from Pipeline Sap Region for Emea as Sap Region." In the example of area 866, the system can decide to remove particular words (such as "by") in order to provide at least a partial suggestion for a search query. This is to ensure that the user receives at least some search query suggestions.

System Rules

In some implementations, system rules can include suggest rules (and suggest business rules), search rules, and graph rules. Suggest rules can function to divide information space while a search result converges with correlated information on a query entered by a user. The suggest rules can allow for iterative modification of what the user is typing. Users can type a primitive list of words or partial words and select a query suggestion out of a user interface. The user can add new terms to the suggestion in order for the user to get closer to a business goal of finding desired information.

Suggest business rules may include priority rules for particular business information. For example, when one or more keywords are obtained in a search, the system 108 can apply a priority rule suggestions when a particular keyword matches a variety of different types of graph elements (e.g., measures, dimensions, values, etc.). In some implementations, the system 108 can dictate priority rules indicating that first priority is given to measures, next to dimensions, and then finally to values. For example, if the query/keyword typed by the user is "SALES" then the system 108 can first suggest the measure "SALES REVENUE," then the dimension SALES CUSTOMER, and then the value UK SALES. In general, an exact match is scored higher and may break this rule to provide the exact match, rather than the partial match.

In one example, a multi-term rule may be used. For example, if the user types "John Deer," the system may return "John Deere" (for customer of same name) in priority compared to "Revenue for John." In one example, a case-sensitivity rule may be used. For example, case sensitivity rule may only be used in the context of an equality (e.g., when comparing the scoring of two measures, two dimensions, two values). For example, if a measure exists named "CUSTOMERS" and a measure named "Customer Count," and the user types "CUSTOMER," the system 108 may return the measure "CUSTOMERS" in a first suggestion position because the two have exact matches and case matches. In some implementations, multiple matches may not be considered as desirable over a single match. For example, if a keyword of "Cust" matches at the same time the measure "Customer Count" and the dimension "CUSTOMER," the proposed suggestion "Customer Count by CUSTOMER" may not receive a higher score than the proposal "Customer Count by Country."

Example Keywords

TABLE 1

| | Keywords |
|---|---|
| Years | recognized when expressed as four digits YYYY, e.g., 2013, 2014 |
| Quarters | recognized when expressed as Q1, Q2, Q3, Q4 (implicit means Q1 current year . . .) or Q1 2014, Q2 2014, Q3 2014, Q4 2014 |
| Months | recognized when using English names or month abbreviations; When expressed only as January, interpreted as implicitly meaning January of current year, otherwise specify as January 2013 |
| Dates | recognized when expressed in Gregorian Calendar format, which means YYYY-MM-DD or YYYYMMDD; Examples (for Dec., 5 2014): 2014-12-05 or 20141205<br>current date/today/now meaning today's date.<br>yesterday meaning yesterday's date<br>tomorrow meaning tomorrow's date<br>"current/this/ongoing/present,<br>next/coming/forthcoming/future/following/upcoming,<br>previous/earlier/last/latest/past/previous/precedent/<br>preceding" keywords that are combined with time units, quarter acronyms, or month names have a special meaning. They implicitly refer to a given period of time.<br>Examples: current quarter, previous year, this month.<br>daily, monthly, quarterly, yearly expresses the user's wish to breakdown things on time depending on the applicable time dimension, e.g., revenue closed monthly, daily bug fix. It means we have a unique time hierarchy to do the breakdown. |
| Time period calculations keywords | year to date/year-to-date/YTD/ytd meaning this quarter to date/quarter-to-date/QTD/qtd meaning this month to date/month-to-date/MTD/mtd meaning this year over year/year on year/year-over-year/year-on-year/YOY/Y/Y/yoy/y/y meaning year on year comparison quarter over quarter/quarter on quarter/quarter-over-quarter/quarter-on-quarter/QOQ/Q/Q/QoQ/q/q meaning quarter over quarter comparison month over month/month on month/month-over-month/MOM/MoM/M/M/mom/m/m meaning month over month comparison |
| by | a break down by one or multiple dimensions |
| for | a filter by one or multiple dimension values |
| as | to specify the dimension of a value. 3M as Customer |
| top/most/max/ maximum/biggest/ highest/largest, bottom/least/min/ minimum/littlest/ lowest/smallest | When these words are suffixed with a number, it means use the top or bottom 10 for a given element. |

Example Rules

BITLVLAR1-403—Support queries like 1 value, no measure, no dimension

BITLVLAR1-404—Support queries like N values (N>1) on the same dimension, no measure, no dimension; Hierarchies may also be supported in suggest, see BITLVLAR1-848—End user can search and get results based on hierarchy names BITLVLAR1-470—Smart BI Time Management Requirement BITLVLAR1-471—End can query my date information as usual time hierarchy levels BITLVLAR1-472—End user can express basic time-related calculations in the search (YTD, QTD, MTD, YOY, QOQ, MOM)

BITLVLAR1-526—End user can type time related keywords to get non-ambiguous suggestions and can choose what makes sense to the user BITLVLAR1-528—End user can express a query like Pipeline current year and the aggregation is dynamically maintained BITLVLAR1-583—End user can type measures and if year information is available, the system can suggest to complete a query with the current year BITLVLAR1-618—When my search query includes hierarchy levels, complete with levels up to the top, including in the visualization itself BITLVLAR1-936—Manage all synonyms (max, min, highest . . . ) to be used for caption and query results BITLVLAR1-938—Manage meaningful structuring key words: a specific scenario is the top 1/bottom 1. Use best result (for top 1) and worst result (for bottom 1). A specific scenario is the top 1/bottom 1. Use best (for top 1) and worst (for bottom 1) When these words are not suffixed with a number, it just orientate sorting. rank/sort also orientates sorting for ascending/climbing/increasing/rising and descending/decreasing/falling as well. Complete the entry of keyword even if the token is only partial. (e.g., the user enters Kingfish and we consider we are allowed to complete it to Kingfisher.)

BITLVLAR1-459—When end user types a measure, dimension, or value, system suggests most relevant completions when typing a measure, a dimension, or a value.

BITLVLAR1-596—Special characters and wildcards are properly handled in search; Wildcard support (both in meta data and questions); wildcard supported is "(double quote). Manage filters on measures, dimensions, numeric dimensions. For a measure, a dimension, or a numeric dimension, the system may interpret the following:

equal(s) (synonyms: =, leave the number alone)
not equal(s) (synonyms: !=)
greater than (synonyms: more than, >)
greater than or equal(s) to (synonyms: more than or equal(s) to, >=)
less than (synonyms: lesser than, <)
less than or equal(s) to (synonyms: lesser than or equal(s) to, <=)
For a text dimension, the system understands:
equal(s) (synonyms: =, leave the text alone)
not equal(s) (synonyms: !=)
begin(s) with
contain(s)
For date dimensions, the system understands:
equal(s) (synonyms: =, leave the number alone)
not equal(s) (synonyms: !=)
before
before or equal(s) to
after
after or equal(s) to Boolean dimensions can be expressed as 1/true or 0/false. Use fuzzy search concept (as proposed by HANA) to be able to auto-correct user typos.

The rules can also include Eliminating irrelevant keywords (e.g., stopwords) to simplify complex queries like business questions. (e.g., What is the revenue for the customer 3M should suggest Revenue for 3M as Customer). The stopwords "What," "is", "the" and "for" can be removed.

Example Security Rules

If data (value of a dimension) or metadata (dimension/ measure) is not accessible to a given user based on security rights, the user may be considered outside of the dataset scope and may be removed from search suggestions. This indicates that some preliminary queries may need to occur to refine search suggestions.

In some implementations, row-level data security as set on the datasets in SAP Lumira Cloud is used with embodiments described in this disclosure. Example security may include administrative security, group/role security, row level data security, asic, custom, user interface security, etc. For example, if a user enters keywords <<Measure1 Dimension1 Dimension2>> and row-level data security exists on Dimension2, applying a filter Dimension2=Val1Dim2, then the system can suggest the following query: Query <<Measure1 Dimension1 Dimension2>>. When the query is executed, the system can automatically apply the filter Dimension2=Val1Dim2

If the user enters keywords <<Measure1 Dimension1 Val2Dim2>> (Val2Dim2 is another valid value for Dimension2), at execution time, the system would not retrieve any data due to the filter Val1Dim2. A new suggestion can be provided since the problem may be on the filter. For instance suggest <<Measure1 Dimension1>> or <<Measure1 Dimension1 Dimension2>> as the system understands that Val2Dim2 came from Dimension2. The query executed may either be (suggest 1) <<Measure1 Dimension1>>, <<Measure1 Dimension1 where Dimension2=Val1Dim2>> (assuming Dimension1 and Dimension2 dependency, or (suggest 2) <<Measure1 Dimension1 Dimension2 Where Dimension2=Val1Dim2>>.

In some implementations, a different security protocol may be used. For example, assuming a revenue (measure) can be split by SAP region (dimension) then Country (dimension). If the user has no security rights to the measure revenue, this measure should not presented in association with the dimension SAP region and/or the dimension country. If the user forces a query to execute (e.g., revenue, revenue by SAP region, or revenue by Country), the term revenue should not be considered. The terms SAP region or Country should be considered. If the user has no security rights on revenue but the user has no security rights to the dimension SAP region (resp. Country), the dimension SAP region (resp. Country) should not be presented in association with revenue. Similar to above, if the user forces a query to execute (e.g., revenue by SAP region or revenue by Country), the terms by SAP region or by Country should not be considered. The term revenue should be considered.

Example Search Business Rules

Search business rules may provide priority to content searches over the visualizations generated by system 100 for the user interface. A match process can be specified in order to perform a priority push. For example, if a measure and a dimension in a chart match the question, the system can determine the impact of filters, top 10, multi-dimension/measure, and/or hierarchies.

In some implementations, the system 100 may not display a Content Search result and a BVR result that has similar question/query and so show more or less the same data. In such an example, the Content Search may be executed first.

In the event that the query has to do with top 10 results and/or hierarchies, a return result may include a data subset rather than a complete match and an Additional Content Search could be filtered to answer the result. For example, if the user enters a query such as "Type Revenue by Customer for 3M," the system may add a filter in "Lumira Viz Revenue by Customer viz" on 3M.

In some implementations, the system 100 may create search-engine visualizations only on dimensions that appear interesting to a user. For example, the system 100 can determine language surrounding a search query as positive or negative weight. In particular, the system 100 can determine a negative weight for a particular dimension or measure in a query when receiving a query with the terms "I don't like."

Figure 9:
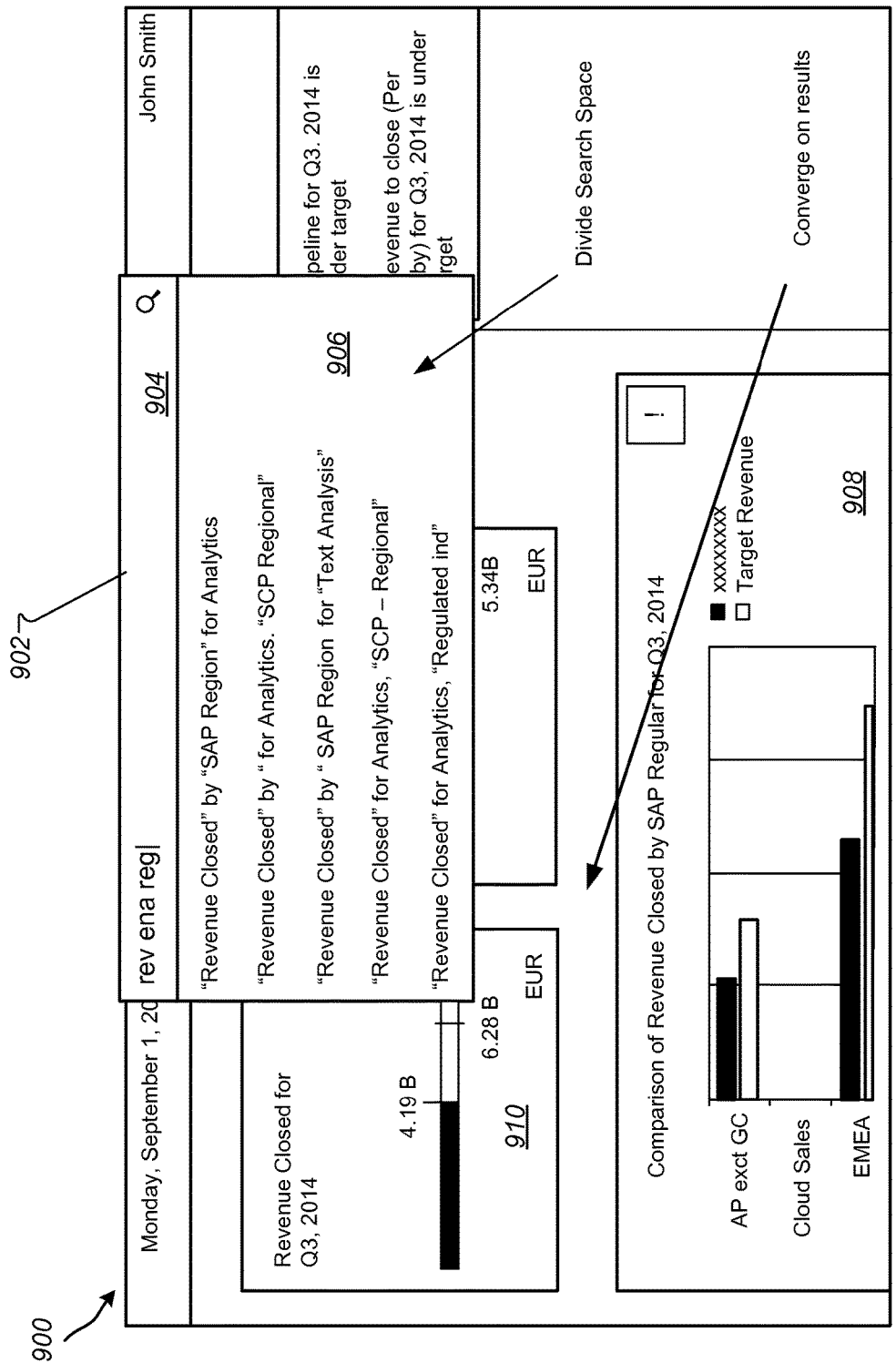
FIG. 9 is a screenshot illustrating an example user interface with a query suggestion user interface.

In some implementations, the system 100 may not display a visualization with a dimension if there is a filter on that dimension. For example, JIRA: "Portfolio Epics (All)" by CUSTOMER for Kingfisher should not be possible to suggest. This should be equivalent to "Portfolio Epics (All)" for CUSTOMER Kingfisher. Graph Business Rules FIG. 9 is a screenshot illustrating an example user interface 900 with a query suggestion user interface 902. In general, a user can enter a naive text query and the systems and methods described in this disclosure can recast the text into contextually relevant search queries that can be provided to the user for selection and execution. The recasting can be performed using a knowledge graph that includes a number of trees/nodes stringing together viable search queries.

In this example, a user is entering a search query, namely, "rev ena reg," shown at query box 904. As described above, the system 108 can analyze and tokenize the text into a number of tokens. The analysis can include determining a search query context and associating the tokens to keywords found in a transitive grammar. Each token (including the associated keywords) can be matched against metadata using a search engine. The resulting matches can be pieced together in a tree (or portion of a knowledge graph) to ascertain a number of possible query suggestions associated with the entered text in box 904. The query suggestions can be translated into human-readable text and provided in a user interface, such as search suggestion area 906. In some implementations, suggest rules can be used to allow for iterative modification of what the user is typing. Users can type a primitive list of words or partial words and select a query suggestion out of a user interface. The user can add new terms to the suggestion in order for the user to get closer to a business goal of finding desired information. Upon analyzing the entered text, the system 108 can provide a number of query suggestions, as shown at search suggestion area 906.

The suggestions shown at 906 can be selected to divide or modify the search space that may be considered. When the system 108 converges on search query content, results can be displayed. Example graphics and additional content are shown by example at visualization 908 and 910.

Figure 10:
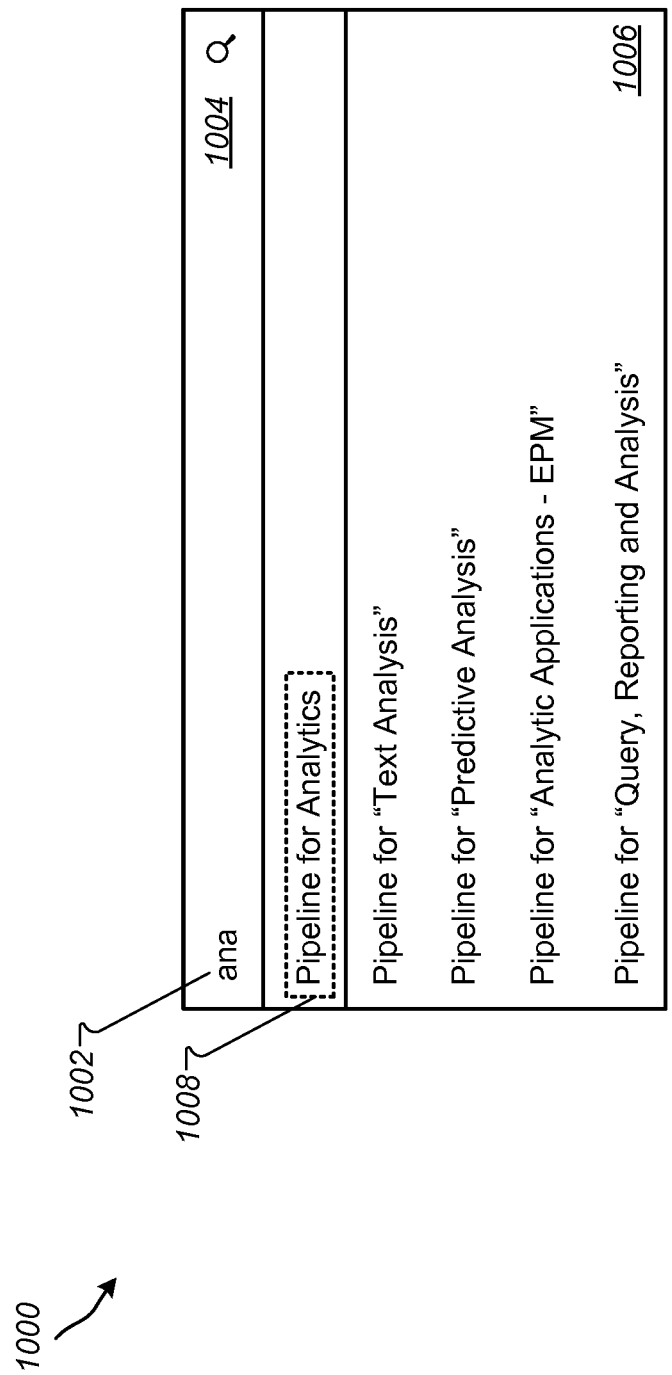
FIG. 10 is a screenshot illustrating an example user interface.

FIG. 10 is a screenshot illustrating an example user interface 1000 of a user entering text in a query box. In this example interface 1000, the user may enter a textual, symbolic, numerical or combinatory query to receive search suggestions and ultimately receive a data visualization of search results pertaining to the entered query. The search suggestions and data visualization may be generated by system 108 and may be defined by graph business rules. Graph business rules may include analyzing measures linked with a dimension. In this example, the user may have began typing the search query "Analytics suggest Pipeline for Analytics" (e.g., "ana" 1002) into query box 1004. In response, the system 108 can provide an ordered list of search query suggestions indicating to the user details about what the system 108 determines the user desires in his search. In this example, the search suggestion area 1006 provided query suggestions such as "Pipeline for Analytics," "Pipeline for Text Analysis," "Pipeline for Analytic Applications-EPM," and Pipeline for Query, Reporting, and Analysis." In some implementations, the system 108 can rank the suggested search queries and provide such queries in a particular order. Here, the user has selected a query suggestion, namely, "Pipeline for Analytics" suggestion 1008.

Figure 11:
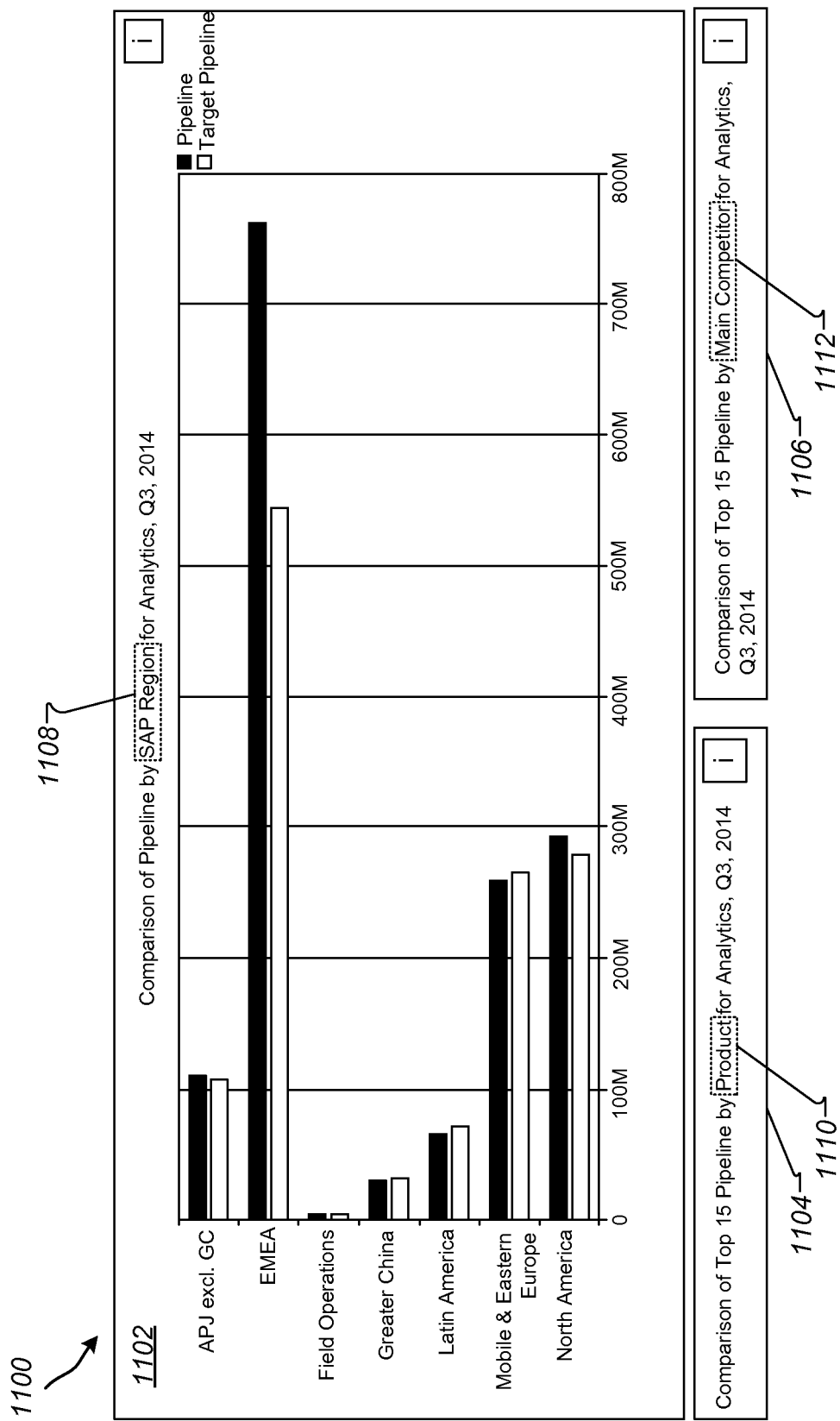
FIG. 11 is a screenshot illustrating an example user interface with search results responsive to text entered into a query box.

FIG. 11 is a screenshot illustrating an example user interface 1100 with search results responsive to text entered into a query box 1004 (FIG. 10). In response to the user selecting the "Pipeline for Analytics" query suggestion, the system 108 automatically generated graph and textual data and ranked such data according to system rules. For example, the system 108 used a query builder, repositories of data, and system rules to provide graphs 1102, 1104, and 1106. In this example, a default rule of importance may apply. Such a rule may indicate that the default sort order for the Pipeline dimension may be Region, Product, and then Sales Phase. Accordingly, the graphs are displayed in that order with a high-ranked keyword highlighted. In this example, the highlighted keywords include keyword 1108, 1110, and 1112.

Figure 12:
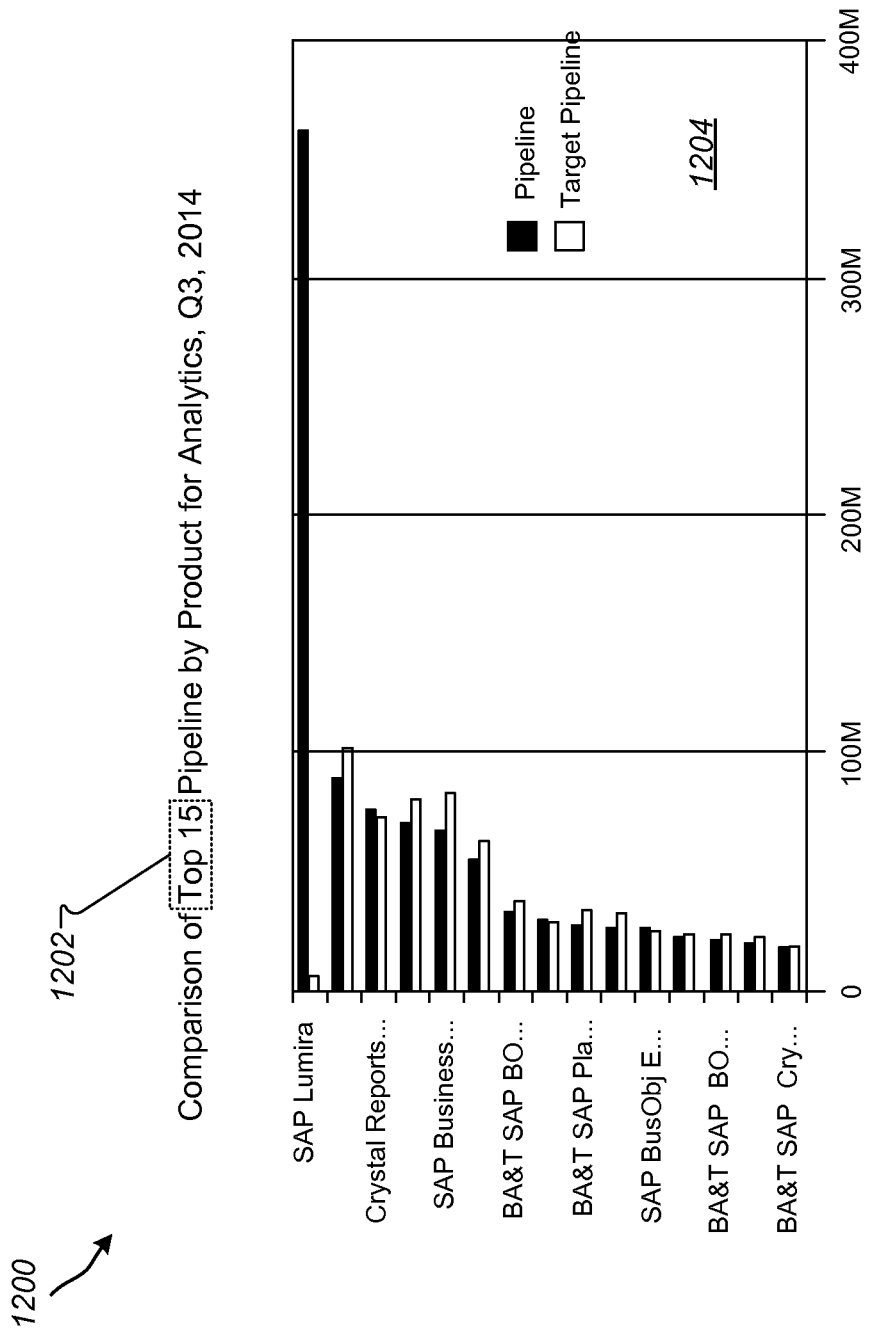
FIG. 12 is a screenshot illustrating another example user interface with search results responsive to text entered into a query box.

FIG. 12 is a screenshot illustrating an example user interface 1200 of search results responsive to text entered into a query box. In some implementations, the system 108 can add additional dimensions and sort on other values. For example, the system 108 can add a filter such as "top 15 results" 1202 on a "Product" dimension that includes 10,000 associated values. This can cause additional or alternative visualizations, such as bar graph 1204 to be produced and displayed to the user.

FIG. 13 is a screenshot illustrating an example user interface 1300 with search results responsive to text entered into a query box. The interface 1300 can be generated when a visualization intent (e.g., group of type) is determined from the user-entered text. In this example, the rules may include defining an intent according to a set of dimensions or measures. For example, the graphic 1300 shows a use list for "Pipeline by country," instead of simply showing the bar chart, as shown in FIG. 12. This can be inferred from Lumira content and/or particular user usage data. For example, any previously built visualization types accessed by the user may be crawled and classified as intent by visualization type.

Figure 14:
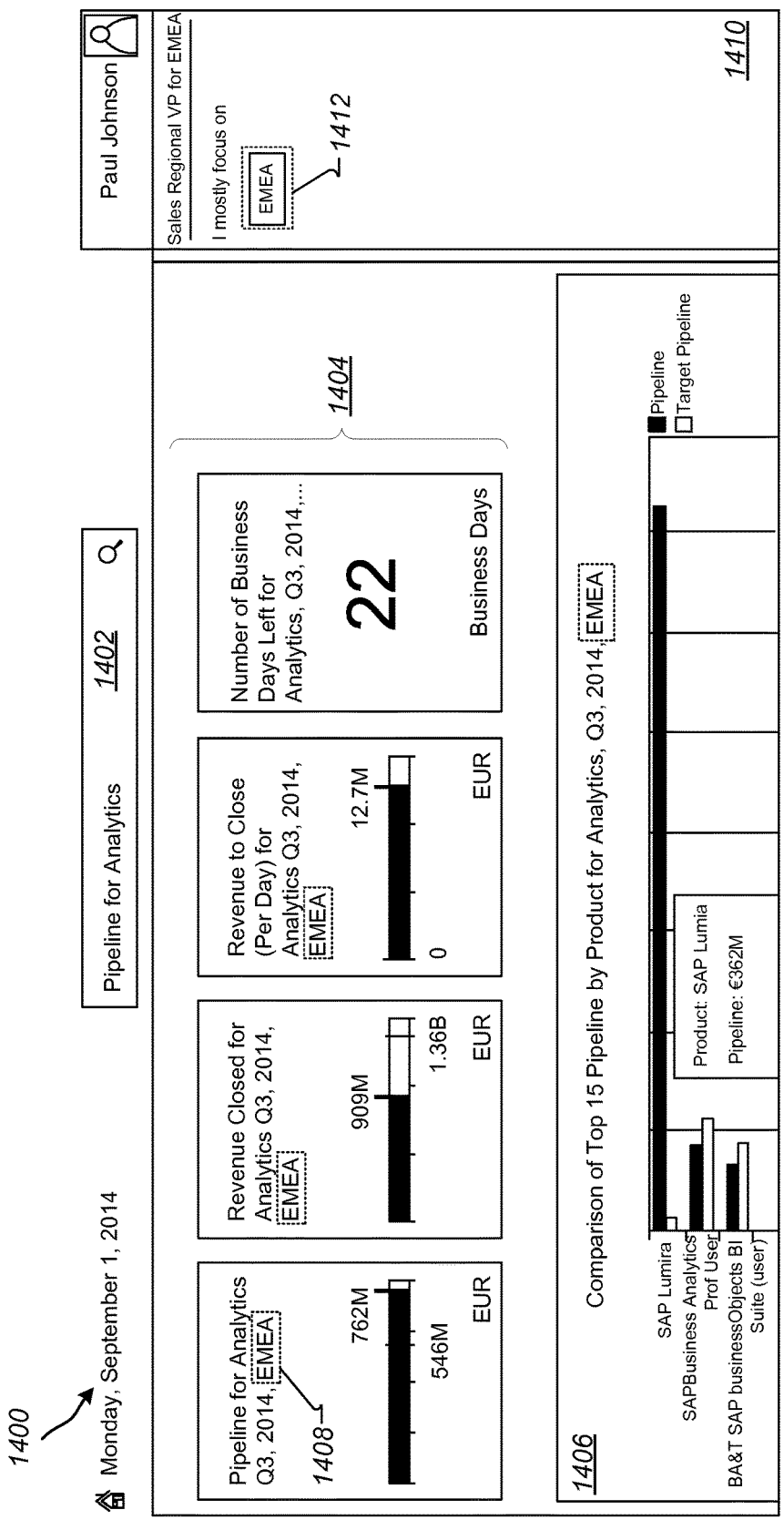
FIG. 14 is a screenshot illustrating another example user interface with search results responsive to text entered into a query box.

FIG. 14 is a screenshot illustrating an example user interface 1400 with search results responsive to text entered into a query box 1402. The user may be accessing user interface 102, for example. In particular, the user entered terms that lead the system to suggest query "Pipeline for Analytics," as shown at 1402. The user can select or type to add additional filters. In some implementations, the system can infer a particular filter from IT setup and/or user profile data. In this example, the use list "EMEA as region" was used as a filter to generate graphics 1404 and 1406. In some implementations, the system 108 can highlight the filter keyword to indicate to the user which metric is being depicted, as shown by dotted lines 1408, and similar dotted lines throughout FIG. 14. In this example, a chat program 1410 associated with application/user interface 102 can be accessed to determine user credentials and or relevant keywords (e.g., EMEA 1412) from discussions and group contacts, for example.

Figure 15:
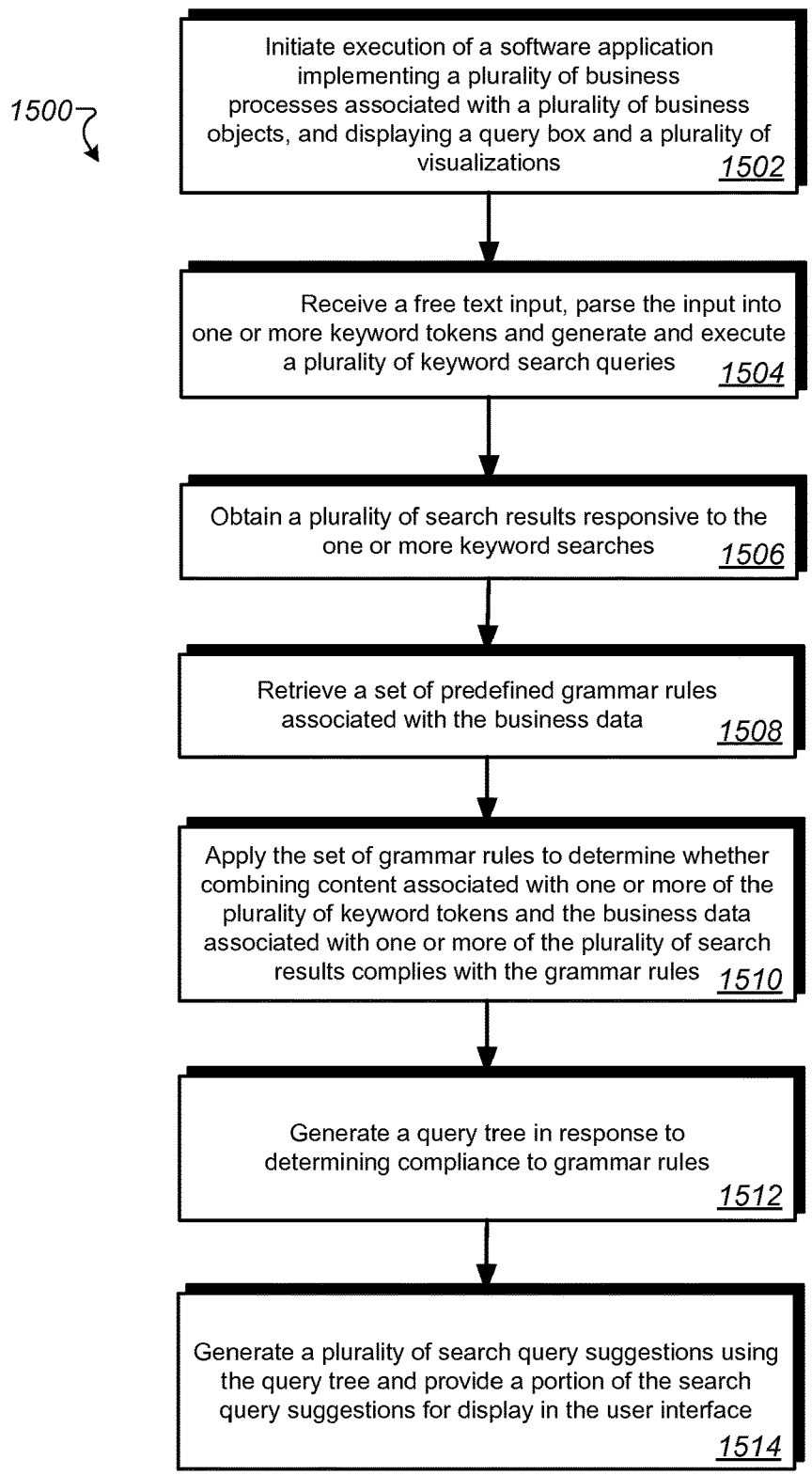
FIG. 15 is a flowchart illustrating example operations of the system of FIG. 1.

Referring to FIG. 15, an exemplary flowchart illustrates example process 1500 implemented in the system of FIG. 1. Process 1500 includes initiating (1502), at a user interface, execution of a software application implementing business processes associated with business objects. For example, user interface 102 may be initiated and executed to provide a user with a search mechanism (e.g., query box) to access business data. The query box can be displayed in interface 102 adjacent to or near visualizations that depict data corresponding to at least a portion of the business objects accessible by the software application hosting the user interface 102.

The query box can be configured to receive (1504) a free text input and to execute a parsing process for the free text input into one or more keyword tokens. The tokens can be used to generate a number of keyword search queries based on the one or more keyword tokens. The generated search queries can then be executed against a metadata repository, such as metadata 120. The metadata repository may be configured to store metadata about business objects and relationships between one or more of the business objects.

The process 1500 may include obtaining (1506) a number of search results responsive to the one or more keyword searches. In some implementations, the search results may include business data, metadata, business object information such as dataset names and relationships, measure names and relationships, and/or dimension names and relationships. For each search result, the process 1500 may include retrieving (1508) a set of predefined grammar rules associated with the business data. The predefined grammar rules are described above with respect to FIG. 8. In some implementations, the grammar rules may be retrieved from a knowledge graph (e.g., knowledge graph 112) configured to include contextual knowledge data between business objects, relationship knowledge data between business objects, and behavioral knowledge data between business objects. In some implementations, the grammar rules may be configured to invoke a soft keyword grammar configured to generate a set of ranked search queries. The soft keyword grammar means that keyword rules are ignored if no possible solution is found. Results satisfying more token rules are preferred in the output if they exist. For each search result, the process 1500 may include applying (1510) the set of grammar rules to determine whether combining content associated with one or more keyword tokens and the business data associated with one or more search results complies with the grammar rules.

For each search result, the process 1500 may include generating (1512) a query tree that connects a first node representing the one or more keyword tokens to a second node representing the business data associated with one or more of the search results, in response to determining compliance to grammar rules.

For each search result, the process 1500 may include generating (1514) a number of search query suggestions using a query tree to retrieve data corresponding to one or more grammar compliant data paths defined in the query tree by one or more connected nodes. The search query suggestions can be provided for display in the user interface.

In some implementations, data related to the search query suggestions may be translated into graphical data and presented to the user in the user interface (e.g., in visualizations areas 908, 910), in response to the user selecting at least one search query suggestion. The translation may include accessing one or more repositories of data to generate sales data associated with at least one business object and generating a bar graph, line graph, pie chart, histogram, flowchart, or other graphical depiction of data.

In some implementations, the process 1500 may also include generating, in the query tree, a node that prohibits connection between the first node and the second node, in response to determining violation of one or more grammar rules. For example, if the system 108 determines that a particular attribute or measure does not belong to a dataset for another attribute or measure, the system may determine that a "same dataset" rule is violated and may not allow the node connection.

In some implementations, the process 1500 may also include iteratively adding one or more nodes to each generated query tree until exhausting the keyword tokens. This can be performed to ensure each piece of a user's text entry is considered. The process 1500 may also include assigning a score to each generated query tree and generating a number of search query suggestions and providing a portion of the search query suggestions for display in the user interface in a ranked order, according to the score associated with each generated query tree. For example, the system 108 may provide a fixed number of search query suggestions based at least in part on the score and on a predefined time constraint. The predefined time constraint may include a search time of less than a few seconds. This time constraint may be imposed to ensure the user is not left waiting lengthy time period to receive query suggestion results.

In some implementations, the process 1500 may also include limiting each generated query tree to fifty nodes, and adding each generated tree to a knowledge graph to provide business search functionality to other users accessing the software application. Limiting of query tree nodes can allow for faster search times and less processing burden when analyzing the query trees.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for generating a plurality of search query suggestions, the method comprising:
    initiating, at a user interface, execution of a software application implementing a plurality of processes associated with a plurality of data objects;
    displaying, in the user interface, a query box and a plurality of visualizations depicting data corresponding to at least a portion of the plurality of data objects;
    receiving a free text input in the query box;
    parsing the free text input into one or more keyword tokens;
    generating a plurality of keyword search queries based on the one or more keyword tokens;
    executing the plurality of keyword search queries against a metadata repository;
    obtaining a plurality of search results responsive to the plurality of keyword search queries, the search results including system data, and for each of the plurality of search results:
        retrieving grammar rules associated with the system data, wherein the grammar rules enable identifying at least a partial match between a keyword and a portion of the system data;
        determining security rules based, at least in part, on credentials of a user and a category of one or more portions of the system data;
        applying the grammar rules to determine whether combining content associated with the one or more keyword tokens and the system data associated with one or more of the plurality of search results complies with the grammar rules;
        filtering at least a portion of the content determined to be noncompliant with the grammar rules;
    generating a query tree that connects a first node representing the one or more keyword tokens to a second node representing the system data associated with one or more of the plurality of search results, in response to determining that combining the content and the system data complies with the grammar rules;
    generating a plurality of search query suggestions using the query tree to retrieve data corresponding to one or more data paths compliant with the grammar rules, wherein the data paths are defined in the query tree by one or more connected nodes; and
    providing one or more of the plurality of search query suggestions, compliant with the security rules, for display in the user interface adjacent to the plurality of visualizations.

2. The method of claim 1, further comprising generating, in the query tree, a node that prohibits connection between the first node and the second node, in response to determining a noncompliance with one or more of the grammar rules.

3. The method of claim 1, further comprising:
    iteratively adding one or more nodes to each generated query tree until exhausting the keyword tokens;
    assigning a score to each generated query tree; and
    generating the plurality of search query suggestions and providing the search query suggestions for display in the user interface in a ranked order, according to the score associated with each generated query tree.

4. The method of claim 3, further comprising providing, in the user interface, a fixed number of search query suggestions based at least in part on the score and on a predefined time constraint.

5. The method of claim 1, wherein the metadata repository is configured to store metadata about the plurality of data objects and relationships between one or more of the plurality of data objects.

6. The method of claim 1, wherein the grammar rules are retrieved from a knowledge graph configured to include contextual knowledge data between data objects, relationship knowledge data between data objects, and behavioral knowledge data between data objects.

7. The method of claim 1, wherein the grammar rules are configured to invoke a soft keyword grammar configured to generate a set of ranked search queries.

8. The method of claim 1, wherein at least one of the plurality of search query suggestions is translated into graphical data and presented to the user in the user interface, in response to the user selecting the at least one search query suggestion, the translation including accessing one or more repositories of data to generate sales data associated with at least one data object in the plurality of data objects.

9. The method of claim 1, further comprising, limiting each generated query tree to fifty nodes, and adding each generated tree to a knowledge graph to provide search functionality to other users accessing the software application.

10. A query management system including instructions stored on a non-transitory computer-readable storage medium, the system comprising:
    a query engine configured to generate a plurality of keyword search queries using one or more keyword tokens, execute the plurality of keyword search queries against a metadata repository, obtain a plurality of search results responsive to the plurality of keyword search queries, generate a plurality of query trees, and from the plurality of query trees, generate a plurality of search query suggestions to retrieve data corresponding to one or more rule compliant data paths defined by the plurality of query trees, and provide query suggestions for display in a user interface;

a knowledge graph including a plurality of query trees configured to connect a plurality of nodes representing data objects associated with keyword tokens and system data in response to determining compliance with grammar rules and to filter the nodes determined to be noncompliant with the system data; and a security engine configured to implement security rules to allow or deny presentation of query suggestions to a user of the user interface, the security rules being based on user usage data, knowledge graph rules, and the grammar rules.

11. The system of claim 10, wherein the security engine is configured to deny access to one or more query suggestions by removing the one or more query suggestions from a list of generated query suggestions before providing the list to a user, the denied access based at least in part on determining that user credentials, associated with the user accessing the user interface, are insufficient.

12. The system of claim 10, wherein the knowledge graph includes a plurality of nodes and edges, the nodes representing data objects having a plurality of functions and variables, and the edges represent similarities between one or more function or variable associated with at least two data objects connected by at least one edge.

13. A non-transitory recordable storage medium having recorded and stored thereon instructions that, when executed, perform at least actions of:

receiving a free text input;

parsing the free text input into one or more keyword tokens;

generating a plurality of keyword search queries based on the one or more keyword tokens;

executing the plurality of keyword search queries against a metadata repository;

obtaining a plurality of search results responsive to the plurality of keyword search queries, the search results including system data, and for each of the plurality of search results:

retrieving grammar rules associated with the system data, wherein the grammar rules enable identifying at least a partial match between a keyword and a portion of the system data;

determining security rules based, at least in part, on credentials of a user and a category of one or more portions of the system data;

applying the grammar rules to determine whether combining content associated with the one or more keyword tokens and the system data associated with one or more of the plurality of search results complies with the grammar rules;

filtering at least a portion of the content determined to be noncompliant with the grammar rules;

generating a query tree that connects a first node representing the one or more keyword tokens to a second node representing the system data associated with one or more of the plurality of search results, in response to determining that combining the content and the system data complies with the grammar rules; and generating a plurality of search query suggestions using the query tree to retrieve data corresponding to one or more data paths compliant with the grammar rules, wherein the data paths are defined in the query tree by one or more connected nodes; and providing one or more of the plurality of search query suggestions, compliant with the security rules, for display in a user interface adjacent to a plurality of visualizations.

14. The non-transitory recordable storage medium of claim 13, wherein the instructions further comprise generating, in the query tree, a node that prohibits connection between the first node and the second node, in response to determining a noncompliance with one or more of the grammar rules.

15. The non-transitory recordable storage medium of claim 13, wherein the instructions further comprise:

iteratively adding one or more nodes to each generated query tree until exhausting the keyword tokens;

assigning a score to each generated query tree; and generating the plurality of search query suggestions and providing the search query suggestions for display in the user interface in a ranked order, according to the score associated with each generated query tree.

16. The non-transitory recordable storage medium of claim 13, wherein the metadata repository is configured to store metadata about system data and relationships between the system data.

17. The non-transitory recordable storage medium of claim 13, wherein the grammar rules are retrieved from a knowledge graph configured to include contextual knowledge data between data objects, relationship knowledge data between data objects, and behavioral knowledge data between data objects.

18. The non-transitory recordable storage medium of claim 13, wherein the grammar rules are configured to invoke a soft keyword grammar configured to generate a set of ranked search queries.

19. The non-transitory recordable storage medium of claim 13, wherein at least one of the plurality of search query suggestions is translated into graphical data and presented in the user interface, in response to the user selecting the at least one search query suggestion, the translation including accessing one or more repositories of data to generate sales data.

20. The non-transitory recordable storage medium of claim 13, wherein the instructions further comprise limiting each generated query tree to fifty nodes, and adding each generated tree to a knowledge graph to provide search functionality.

* * * * *